US012581693B2

(12) United States Patent (10) Patent No.: US 12,581,693 B2
Yamazaki et al. (45) Date of Patent: Mar. 17, 2026

(54) SEMICONDUCTOR DEVICE

(71) Applicant: Semiconductor Energy Laboratory Co., Ltd., Kanagawa-ken (JP)

(72) Inventors: Shunpei Yamazaki, Setagaya (JP); Takayuki Ikeda, Atsugi (JP); Tatsuya Onuki, Atsugi (JP); Yuto Yakubo, Atsugi (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 530 days.

(21) Appl. No.: 17/924,166

(22) PCT Filed: May 6, 2021

(86) PCT No.: PCT/IB2021/053820
§ 371 (c)(1),
(2) Date: Nov. 9, 2022

(87) PCT Pub. No.: WO2021/229374
PCT Pub. Date: Nov. 18, 2021

(65) Prior Publication Data
US 2023/0178654 A1 Jun. 8, 2023

(30) Foreign Application Priority Data

May 15, 2020 (JP) ................................. 2020-086266

(51) Int. Cl.
*G06F 21/34* (2013.01)
*G06F 7/544* (2006.01)
(Continued)

(52) U.S. Cl.
CPC ....... *H10D 30/6755* (2025.01); *G06F 7/5443* (2013.01); *G06F 21/34* (2013.01); *H01L 23/298* (2013.01)

(58) Field of Classification Search
CPC ... H10D 30/6755; G06F 7/5443; G06F 21/34; H01L 23/298
(Continued)

(56) References Cited

U.S. PATENT DOCUMENTS 7,777,631 B2 8/2010 Rodgers
7,839,124 B2 11/2010 Yamazaki. et al.
(Continued)

FOREIGN PATENT DOCUMENTS

CN 112085132 A 12/2020
CN 212365034 U 1/2021
(Continued)

OTHER PUBLICATIONS

International Search Report (Application No. PCT/IB2021/053820) Dated Jul. 20, 2021.
(Continued)

*Primary Examiner* — Monica D Harrison
(74) *Attorney, Agent, or Firm* — Husch Blackwell LLP

(57) ABSTRACT

A semiconductor device that can be embedded in a living body is provided. The semiconductor device being embeddable in a living body includes a communication portion, a control portion, a memory portion, an arithmetic portion, and a sensor portion. The control portion has a function of controlling the communication portion, the arithmetic portion, and the memory portion. The memory portion has a function of retaining identification information. The arithmetic portion has a function of using first information and second information supplied from the sensor portion to generate third information. The control portion has a function of making the arithmetic portion perform arithmetic processing in response to a signal input through the communication portion. The control portion has a function of outputting, through the communication portion to the out-
(Continued)

side, one or both of the identification information and the third information, in response to a signal input through the communication portion. The arithmetic portion preferably includes a transistor including an oxide semiconductor in a channel formation region. The semiconductor device is preferably covered with a coating material.

11 Claims, 13 Drawing Sheets

(51) Int. Cl.
H01L 23/29 (2006.01)
H10D 30/67 (2025.01)
(58) Field of Classification Search
USPC ........................................................... 257/43
See application file for complete search history.

(56) References Cited

U.S. PATENT DOCUMENTS

| | | | |
|---|---|---|---|
| 7,928,697 B2 | 4/2011 | Yamazaki. et al. |
| 8,169,192 B2 | 5/2012 | Yamazaki. et al. |
| 8,530,265 B2 | 9/2013 | Fan |
| 8,585,775 B2 | 11/2013 | Hirota et al. |
| 8,613,135 B2 | 12/2013 | Fan |
| 8,954,156 B2 | 2/2015 | Fan |
| 9,114,004 B2 | 8/2015 | Fan |
| 9,155,881 B2 | 10/2015 | Fan |
| 9,224,716 B2 | 12/2015 | Fan |
| 9,731,130 B2 | 8/2017 | Fan |
| 9,837,157 B2 | 12/2017 | Tamura |
| 10,388,380 B2 | 8/2019 | Tamura |
| 10,964,393 B2 | 3/2021 | Tamura |
| 11,431,199 B2 | 8/2022 | Kusunoki et al. |
| 11,444,056 B2 | 9/2022 | Chen et al. |
| 11,488,668 B2 | 11/2022 | Tamura |
| 11,630,516 B1 | 4/2023 | Chen et al. |
| 11,817,726 B2 | 11/2023 | Kusunoki et al. |
| 2007/0232884 A1 | 10/2007 | Maschke |
| 2007/0238213 A1 | 10/2007 | Yamaguchi et al. |
| 2008/0042849 A1 | 2/2008 | Saito. et al. |
| 2008/0076974 A1 | 3/2008 | Yamazaki et al. |

| | | | |
|---|---|---|---|
| 2008/0106419 A1 | 5/2008 | Sakama et al. |
| 2008/0135627 A1 | 6/2008 | Noda et al. |
| 2008/0211302 A1 | 9/2008 | Hirota et al. |
| 2008/0238663 A1 | 10/2008 | Saito et al. |
| 2011/0187328 A1* | 8/2011 | Yamazaki ............. H01M 10/46 |
| | | | 320/136 |
| 2012/0109255 A1 | 5/2012 | Fan |
| 2015/0340094 A1 | 11/2015 | Tamura |
| 2016/0043070 A1 | 2/2016 | Momo et al. |
| 2016/0094236 A1 | 3/2016 | Shionoiri et al. |
| 2016/0204437 A1 | 7/2016 | Tajima et al. |
| 2018/0114578 A1* | 4/2018 | Ishizu ...................... G11C 7/10 |
| 2019/0130087 A1 | 5/2019 | Mori et al. |
| 2020/0085375 A1 | 3/2020 | Tolosa et al. |
| 2021/0007602 A1 | 1/2021 | Seo et al. |

FOREIGN PATENT DOCUMENTS

| | | |
|---|---|---|
| CN | 219203493 U | 6/2023 |
| DK | 201700432 | 4/2019 |
| EP | 1 955 679 A1 | 8/2008 |
| EP | 4491215 A | 1/2025 |
| JP | 2008-109646 A | 5/2008 |
| JP | 2008-212652 A | 9/2008 |
| JP | 2014-503229 | 2/2014 |
| JP | 2016-001729 A | 1/2016 |
| JP | 2018-129046 A | 8/2018 |
| JP | 2019-046199 A | 3/2019 |
| JP | 2019-079415 A | 5/2019 |
| KR | 2015-0135128 A | 12/2015 |
| KR | 2024-0052611 A | 4/2024 |
| KR | 2024-0052612 A | 4/2024 |
| TW | 201601682 | 1/2016 |
| WO | WO-2012/058477 | 5/2012 |
| WO | WO-2012/154211 | 11/2012 |
| WO | WO-2019/087010 | 5/2019 |
| WO | WO-2023/038829 | 3/2023 |

OTHER PUBLICATIONS

Written Opinion (Application No. PCT/IB2021/053820) Dated Jul. 20, 2021.
Eerens.W et al., "Biohacking and Chip Implantation in the Human Hand: An Introduction", Journal of Hand Surgery Global Online, Mar. 28, 2024, vol. 6, No. 4, pp. 463-465.

* cited by examiner

FIG. 2A
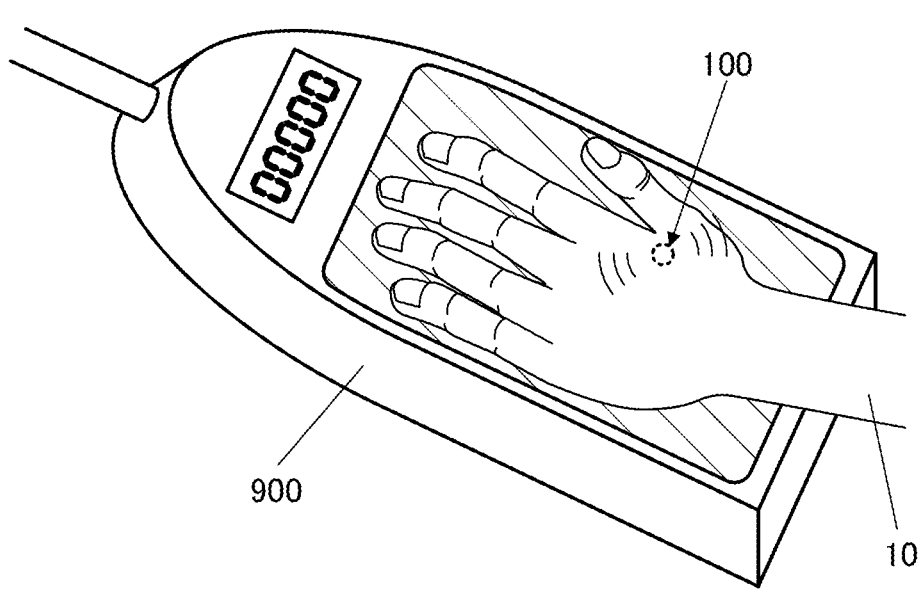
FIG. 2B
FIG. 2C
FIG. 2D
FIG. 2E
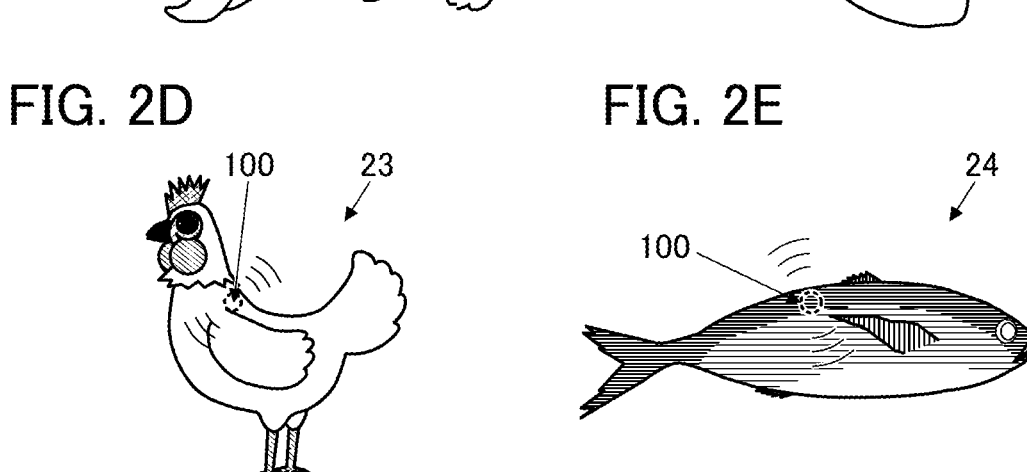

SEMICONDUCTOR DEVICE

This application is a 371 of international application PCT/IB2021/053820 filed on May 6, 2021 which is incorporated herein by reference.

TECHNICAL FIELD

One embodiment of the present invention relates to a semiconductor device.

Note that one embodiment of the present invention is not limited to the above technical field. The technical field of the invention disclosed in this specification and the like relates to an object, a method, or a manufacturing method. One embodiment of the present invention relates to a process, a machine, manufacture, or a composition of matter.

In this specification and the like, a semiconductor device generally means a device that can function by utilizing semiconductor characteristics. Thus, a semiconductor element such as a transistor or a diode and a circuit including a semiconductor element are semiconductor devices. A display apparatus, a light-emitting apparatus, a lighting device, an electro-optical device, a communication device, an electronic device, and the like may include a semiconductor element or a semiconductor circuit. Thus, a display apparatus, a light-emitting apparatus, a lighting device, an electro-optical device, an imaging device, a communication device, an electronic device, and the like are referred to as a semiconductor device in some cases.

BACKGROUND ART

In recent years, authentication devices using human biological characteristics such as fingerprints, palm prints, vein patterns, voice prints, iris patterns, retinal patterns, facial shapes, or body shapes have been developed. For example, vein authentication devices using vein patterns have been put into practical use for bank's ATMs and the like. In addition, Patent Document 1 discloses electronic devices such as smartphones capable of fingerprint authentication.

REFERENCE

Patent Document

[Patent Document 1] Japanese Published Patent Application No. 2019-79415

SUMMARY OF THE INVENTION

Problems to be Solved by the Invention

Since forgery of biological information is difficult, an authentication device using biological information enables highly accurate identification. On the other hand, a change in biological information due to injuries, diseases, or aging may make identification of individuals difficult.

An object of one embodiment of the present invention is to provide a semiconductor device that can be embedded in a living body. Another object is to provide a semiconductor device capable of highly accurate individual identification. Another object is to provide a highly reliable semiconductor device. Another object is to provide a semiconductor device with low power consumption. Another object is to provide a novel semiconductor device.

Note that the description of these objects does not preclude the existence of other objects. In one embodiment of the present invention, there is no need to achieve all the objects. Note that other objects will be apparent from the descriptions of the specification, the drawings, the claims, and the like, and other objects can be derived from the descriptions of the specification, the drawings, the claims, and the like.

Means for Solving the Problems

One embodiment of the present invention is a semiconductor device being embeddable in a living body, including a communication portion, a control portion, a memory portion, an arithmetic portion, and a sensor portion. The memory portion has a function of retaining identification information. The arithmetic portion has a function of retaining first information, and a function of using the first information and second information supplied from the sensor portion to generate third information. The control portion has a function of outputting, through the communication portion to the outside, one or both of the identification information and the third information, in response to a signal input through the communication portion. The arithmetic portion includes a transistor including an oxide semiconductor in a channel formation region.

The oxide semiconductor preferably contains at least one or both of indium and zinc.

The arithmetic portion may have a function of performing a product-sum operation. The first information is weight information, for example. The semiconductor device of one embodiment of the present invention is preferably covered with a coating material.

Effect of the Invention

According to one embodiment of the present invention, a semiconductor device that can be embedded in a living body can be provided. Alternatively, a semiconductor device capable of highly accurate individual identification can be provided. Alternatively, a highly reliable semiconductor device can be provided. Alternatively, a semiconductor device with low power consumption can be provided. Alternatively, a novel semiconductor device can be provided.

Note that the description of these effects does not preclude the existence of other effects. One embodiment of the present invention does not have to have all these effects. Other effects will be apparent from the descriptions of the specification, the drawings, the claims, and the like, and other effects can be derived from the descriptions of the specification, the drawings, the claims, and the like.

BRIEF DESCRIPTION OF THE DRAWINGS

FIG. 2A, FIG. 2B, FIG. 2C, FIG. 2D, and FIG. 2E are diagrams each illustrating a usage example of the semiconductor device 100.

MODE FOR CARRYING OUT THE INVENTION

Figure 1A:
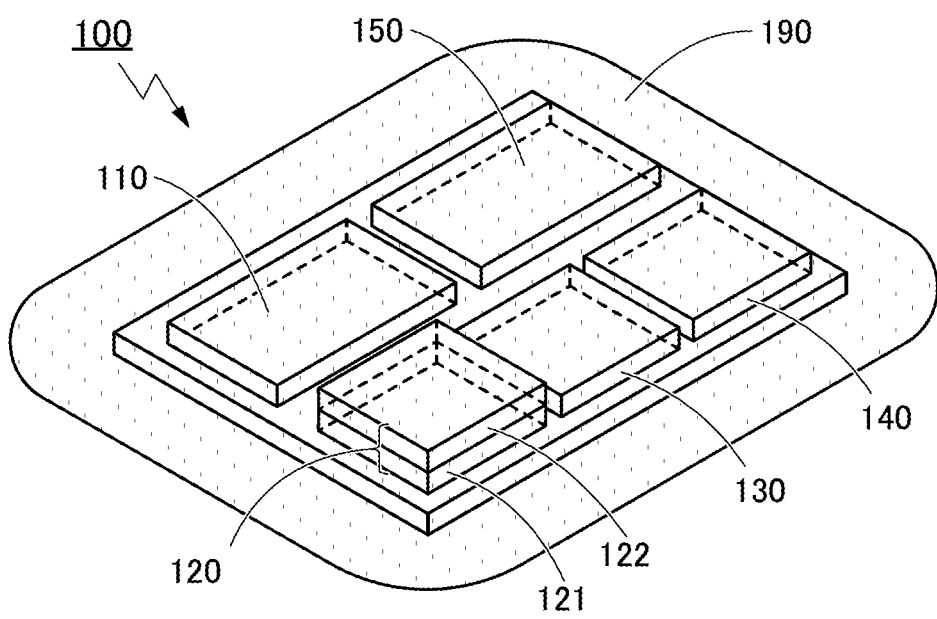
FIG. 1A is a perspective view of a semiconductor device 100.

Embodiments will be described in detail with reference to the drawings. However, the present invention is not limited to the following description, and it is readily appreciated by those skilled in the art that modes and details can be modified in various ways without departing from the spirit and the scope of the present invention. Thus, the present invention should not be construed as being limited to the description in the following embodiments. Note that in the structures of the invention described below, the same portions or portions having similar functions are denoted by the same reference numerals in different drawings, and description thereof is not repeated.

The position, size, range, and the like of each component illustrated in the drawings and the like are not accurately represented in some cases to facilitate understanding of the invention. Therefore, the disclosed invention is not necessarily limited to the position, size, range, or the like disclosed in the drawings and the like. For example, in the actual manufacturing process, a resist mask or the like might be unintentionally reduced in size by treatment such as etching, which is not reflected in the drawing to facilitate understanding.

Embodiment 1

A semiconductor device 100 of one embodiment of the present invention will be described. FIG. 1A is a perspective external view of the semiconductor device 100 that can be embedded in a living body. The semiconductor device 100 includes a communication portion 110, an arithmetic portion 120, a control portion 130, a memory portion 140, and a sensor portion 150. The semiconductor device 100 is covered with a coating material 190.

The communication portion 110 has a function of receiving a signal transmitted from an external device (not illustrated) and transmitting a signal to the external device through wireless communication. The communication portion 110 also has a function of receiving electric power supplied from the external device in a non-contact manner.

Note that the semiconductor device 100 may be provided with a battery. The battery has a function of storing electric power needed for the operation of the semiconductor device 100 and a function of supplying electric power needed for the operation. A primary battery or a secondary battery can be used as the battery. Note that a lithium-ion secondary battery may be used as the secondary battery, for example.

The arithmetic portion 120 includes an arithmetic circuit 121 and a memory circuit 122. The arithmetic circuit 121 has a function of performing arithmetic processing using information included in the memory circuit 122. The arithmetic circuit 121 also has a function of performing arithmetic processing using information included in the memory circuit 122 and information obtained by the sensor portion 150. The arithmetic circuit 121 also has a function of performing arithmetic processing using information included in the memory portion 140. The arithmetic result is retained in the memory portion 140.

The memory portion 140 has a function of retaining identification information of the semiconductor device 100. The memory portion 140 also has a function of storing a program or a parameter related to the operation of the semiconductor device 100. As the memory portion 140, RAM (Random Access Memory) such as DRAM (Dynamic Random Access Memory) and SRAM (Static Random Access Memory), or nonvolatile memory such as ROM (Read Only Memory) can be used. At least part of the memory portion 140 is preferably a rewritable memory.

The control portion 130 has a function of controlling the operation of the communication portion 110, the arithmetic portion 120, the memory portion 140, and the sensor portion 150. The control portion 130 has a function of converting an analog signal supplied from the sensor portion 150 or the like into a digital signal. The control portion 130 has a function of transmitting the identification information and/or an arithmetic result to an external device in response to a signal supplied from the external device through the communication portion 110.

For the sensor portion 150, a sensor that can sense a variety of information can be used. For example, the sensor portion 150 has a function of sensing at least one of temperature, vibration, pressure, gradients, acceleration, oxygen concentrations, and chemical substances. Note that the sensor portion 150 may have a function of converting an analog signal into a digital signal.

The semiconductor device 100 is preferably covered with the coating material 190. The use of the coating material 190 can reduce the occurrence of an inflammatory reaction or an allergic reaction after the semiconductor device 100 is embedded in a living body. Furthermore, covering the semiconductor device 100 with the coating material 190 can prevent damage to the living body such as a blood vessel or nerve tissue which is adjacent to a portion where the semiconductor device 100 is embedded. Examples of a material used for the coating material 190 include a high polymeric material such as biocompatible glass, a silicon resin, or a fluorine resin.

Figure 1B:
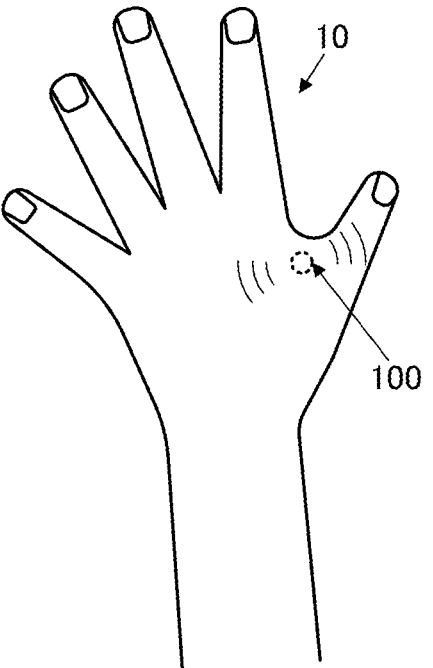
FIG. 1B and FIG. 1C are diagrams each illustrating a usage example of the semiconductor device 100.
Figure 1C:
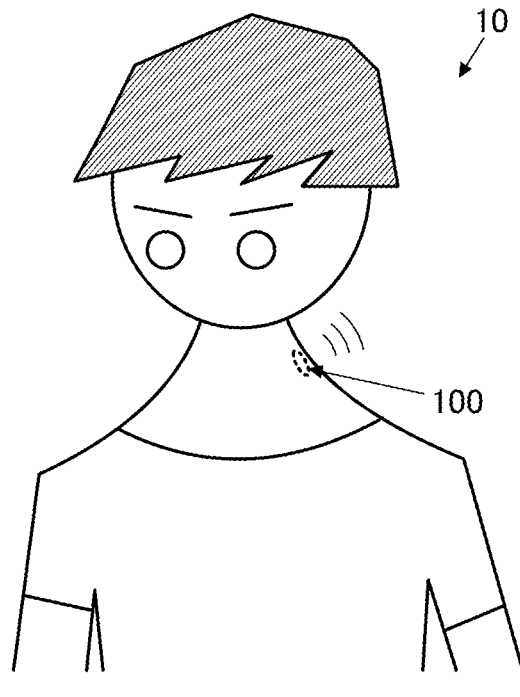

FIG. 1B and FIG. 1C are schematic views each illustrating a condition where the semiconductor device 100 is embedded in a living body 10. FIG. 1B shows a state where the semiconductor device 100 is embedded under the skin between the thumb and forefinger of the living body 10. FIG. 1C shows a state where the semiconductor device 100 is embedded under the skin at the neck of the living body 10.

With the semiconductor device 100 embedded in the living body 10, biological information such as the body temperature and heart rate of the living body 10 can be obtained. In addition, providing the semiconductor device 100 with identification information unique to the living body 10 enables the semiconductor device 100 to function as an individual identification tag (e.g., an Individual Number Card (My Number Card)), driver's license, a health insurance card, a passport, a cash card, a credit card, or the like.

As shown in FIG. 2A, for example, information of the living body 10 can be read out when the semiconductor device 100 embedded in the living body 10 is placed over an external device 900. The external device 900 has a function of transmitting a signal to the semiconductor device 100 and a function of receiving a signal transmitted from the semiconductor device 100. The external device 900 functions as a reader/writer.

The semiconductor device 100 can also be embedded in a variety of living bodies. For example, as shown in FIG. 2B to FIG. 2E, the semiconductor device 100 can be embedded in a living body 21, a living body 22, a living body 23, a living body 24, or the like. The use of the semiconductor device 100 enables the living body 21 to the living body 24 to be prevented from theft, the movement of the living body 21 to the living body 24 to be tracked, or the health conditions of the living body 21 to the living body 24 to be monitored, for example.

<<Communication Portion 110>>

Figure 3:
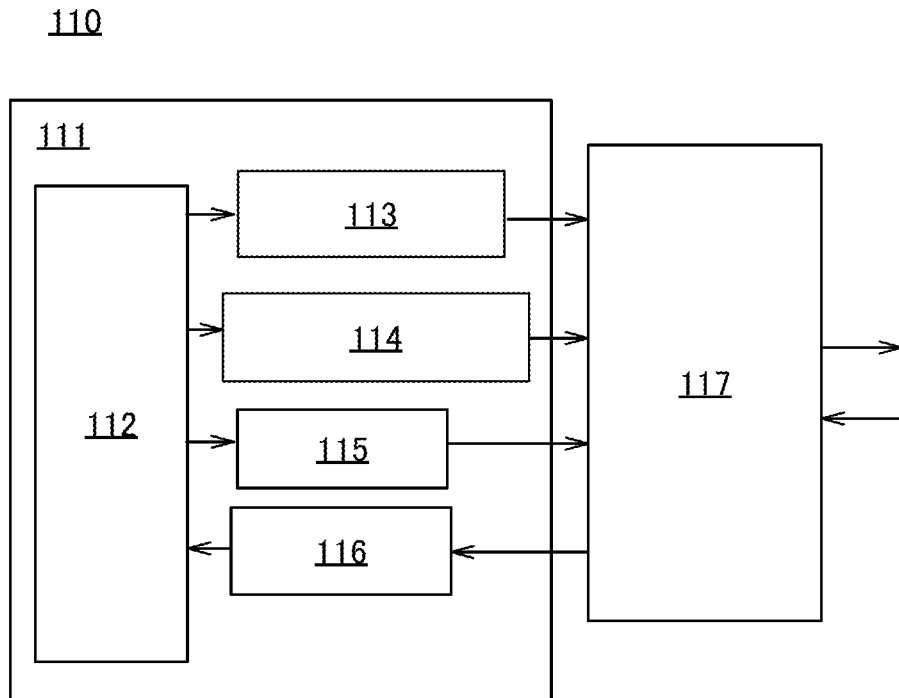
FIG. 3 is a block diagram illustrating a structure of a communication portion.

FIG. 3 is a block diagram illustrating a structure of the communication portion 110. The communication portion 110 includes an RF circuit 111 and an information processing circuit 117. The RF circuit 111 includes a resonant circuit 112, a power supply circuit 113, a clock generation circuit 114, a demodulation circuit 115, and a modulation circuit 116.

The resonant circuit 112 is connected to the power supply circuit 113, the clock generation circuit 114, the demodulation circuit 115, and the modulation circuit 116. The resonant circuit 112 has a function of converting an electromagnetic wave transmitted from an external device into an AC signal. The signal contains information such as an operation instruction. The power supply circuit 113 has a function of generating, from the signal, electric power used for the operation of the semiconductor device 100. The clock generation circuit 114 has a function of generating, from the signal, a synchronization signal which is necessary for the operation of the semiconductor device 100. The demodulation circuit 115 has a function of extracting information such as the operation instruction from the signal.

The information processing circuit 117 has a function of extracting an instruction from the information extracted from the demodulation circuit 115 and transmitting the instruction to the control portion 130. The information processing circuit 117 also has a function of supplying a signal supplied from the control portion 130 to the modulation circuit 116. The modulation circuit 116 has a function of mixing a signal supplied from the control portion 130 with a carrier wave. The resonant circuit 112 has a function of transmitting the signal mixed in the modulation circuit 116 toward the outside.

<<Arithmetic Portion 120>>

A semiconductor device 300 that can be used for the arithmetic portion 120 will be described. Note that an arithmetic circuit 360 to be described later corresponds to the arithmetic circuit 121 in the arithmetic portion 120. A memory circuit 350 to be described later corresponds to the memory circuit 122 in the arithmetic portion 120.

The semiconductor device 300 described in this embodiment is a semiconductor device which is excellent in computing efficiency and can be operated with ultra-low power consumption. In other words, the semiconductor device 300 is a semiconductor device that can function as a computer potentially replicating the function of the human brain (also referred to as Brain Morphic Computer (BMC)).

<Block Diagram>

Figure 4:
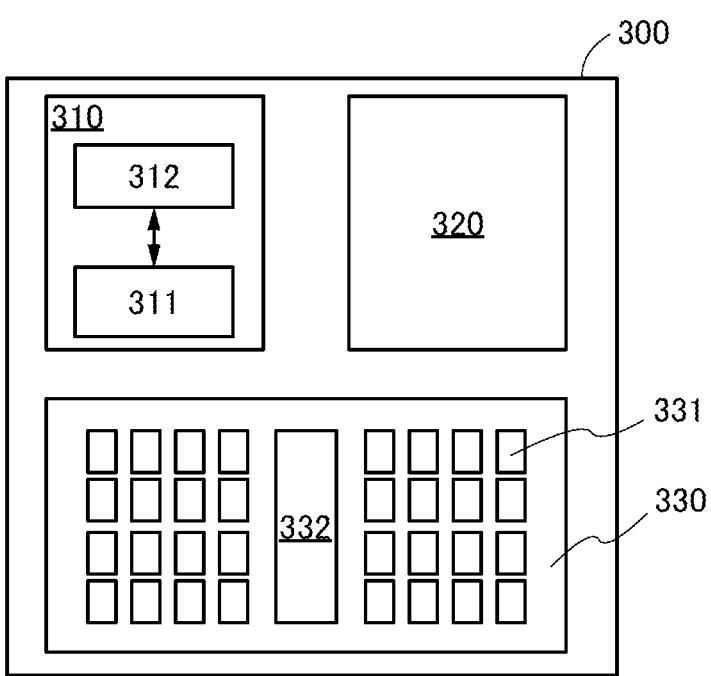
FIG. 4 is a block diagram illustrating a structure example of a semiconductor device.

FIG. 4 shows a block diagram illustrating a structure of the semiconductor device 300. The semiconductor device 300 includes a CPU 310, a bus 320, and an accelerator 330. The CPU 310 includes a CPU core 311 and a backup circuit 312. The accelerator 330 includes, in addition to a plurality of arithmetic blocks 331, a control portion 332 for controlling input/output of data between the arithmetic blocks 331.

The CPU 310 has a function of performing general-purpose processing such as execution of an operating system, control of data, and execution of various arithmetic operations and programs. The CPU 310 includes the CPU core 311. The CPU core 311 corresponds to one or a plurality of CPU cores.

The CPU 310 includes the backup circuit 312 that can retain data stored in the CPU core 311 even when the supply of power supply voltage is stopped. The supply of power supply voltage can be controlled by electric isolation by a power switch or the like from a power domain. Note that power supply voltage is referred to as driving voltage in some cases.

As the backup circuit 312, for example, an OS memory including OS transistors is suitable. Note that an OS memory refers to a memory including a transistor (an OS transistor) with an oxide semiconductor in a channel formation region, such as NOSRAM. Note that "NOSRAM (registered trademark)" is an abbreviation for "Nonvolatile Oxide Semiconductor RAM".

A metal oxide used for an OS transistor is Zn oxide, Zn—Sn oxide, Ga—Sn oxide, In—Ga oxide, In—Zn oxide, In—M—Zn oxide (M is Ti, Ga, Y, Zr, La, Ce, Nd, Sn, or Hf), or the like. The use of a metal oxide containing Ga as M for the OS transistor is particularly preferable because the electrical characteristics such as field-effect mobility of the transistor can be made excellent by adjusting a ratio of elements. In addition, an oxide containing indium and zinc may contain one or more kinds selected from aluminum, gallium, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like.

In order to improve the reliability and electrical characteristics of the OS transistor, it is preferable that the metal oxide used in the semiconductor layer be a metal oxide having a crystal portion such as CAAC-OS, CAC-OS, or nc-OS. CAAC-OS is an abbreviation for c-axis-aligned crystalline oxide semiconductor. CAC-OS is an abbreviation for Cloud-Aligned Composite oxide semiconductor. In addition, nc-OS is an abbreviation for nanocrystalline oxide semiconductor.

An OS transistor has extremely low current that flows between a source and a drain in an off state, that is, leakage current. A NOSRAM can be used as a nonvolatile memory by retaining electric charge corresponding to data in the memory circuit, using characteristics of an extremely low leakage current. In particular, a NOSRAM is capable of reading out retained data without destruction (non-destructive reading), and thus is suitable for parallel processing of product-sum operations of a neural network in which data reading operation is repeated many times.

A metal oxide functioning as an oxide semiconductor has a band gap of 2.5 eV or wider; thus, an OS transistor has an extremely low off-state current. For example, the off-state current per micrometer in channel width at a source-drain voltage of 3.5 V and room temperature (25° C.) can be lower than $1 \times 10^{-20}$ A, lower than $1 \times 10^{-22}$ A, or lower than $1 \times 10^{-24}$ A. Therefore, in an OS memory, the amount of electric charge that leaks from a retention node through the OS transistor is extremely small. Accordingly, the OS memory can function as a nonvolatile memory circuit; thus, power gating of the CPU 310 is enabled.

The backup circuit 312 formed using an OS transistor can be stacked over the CPU core 311 that can be formed using a transistor containing silicon in a channel formation region (a Si transistor). The area of the backup circuit 312 is smaller than that of the CPU core 311; thus, the circuit area is not increased when the backup circuit 312 is provided over the CPU core 311.

The backup circuit 312 has a function of retaining data of a register included in the CPU core 311. The backup circuit 312 is also referred to as a data retention circuit. Note that a semiconductor layer including a channel formation region of a Si transistor may be either a single crystal semiconductor or a polycrystalline semiconductor.

The control portion 332 includes a memory circuit such as an SRAM inside. The control portion 332 retains output data obtained in the plurality of arithmetic blocks 331 in the memory circuit. Then, output data retained in the memory circuit is output to a plurality of semiconductor devices. With such a structure, it is possible to perform parallel computation with an increased number of parallel processes using the plurality of semiconductor devices.

The bus 320 electrically connects the CPU 310 to the accelerator 330. That is, data can be transferred between the CPU 310 and the accelerator 330 through the bus 320.

<Arithmetic Block>

The above-mentioned accelerator 330 executes a program (also referred to as kernel or a kernel program) called from a host program. The accelerator 330 can perform parallel processing of a matrix operation in graphics processing, parallel processing of a product-sum operation of a neural network, and parallel processing of a floating-point operation in a scientific computation, for example. Here, a configuration example of the arithmetic block 331 where arithmetic processing of a plurality of pieces of data is performed in parallel (parallel processing) in the accelerator 330 is described.

Figure 5A:
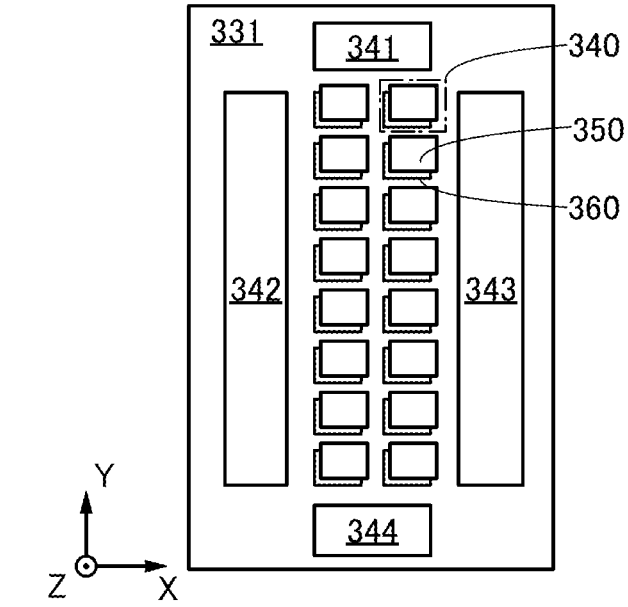
FIG. 5A and FIG. 5B are diagrams each illustrating a structure example of a semiconductor device.
Figure 5B:
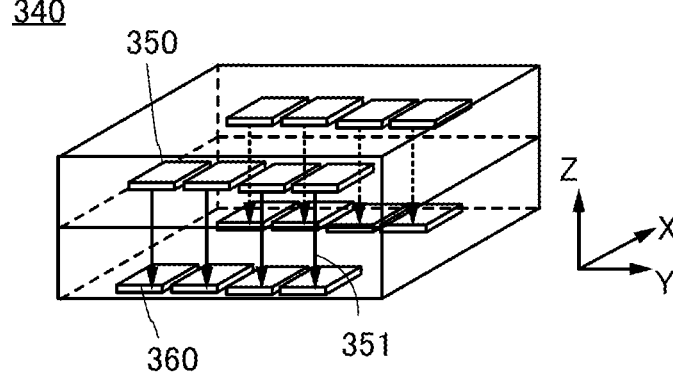

The arithmetic block 331 includes a plurality of arithmetic units 340, as shown in FIG. 5A. The arithmetic unit 340 includes the memory circuit 350 and the arithmetic circuit 360. As shown in FIG. 5A and FIG. 5B, the memory circuit 350 and the arithmetic circuit 360 are provided in different layers in a direction (the Z direction in FIG. 5A) substantially perpendicular to the X-Y plane in the drawing. In other words, the memory circuit 350 and the arithmetic circuit 360 are provided by stacking.

Note that "substantially perpendicular" refers to a state where an arrangement angle is greater than or equal to 85° and less than or equal to 95°. Note that in this specification, the X direction, the Y direction, and the Z direction illustrated in FIG. 5B or the like are directions orthogonal to or intersecting with each other. Here, it is preferable that the X direction and the Y direction be parallel or substantially parallel to a substrate surface and the Z direction be perpendicular or substantially perpendicular to the substrate surface.

The memory circuit 350 includes a plurality of memory cells. Data write/read to/from the memory cells is controlled by a driver circuit 341 and a driver circuit 342. The driver circuit 341 and the driver circuit 342 are also referred to as data control circuits.

Information (data) stored in the memory cells in the memory circuit 350 is data (weight data) that corresponds to a weight parameter used for a product-sum operation of a neural network. When the weight data is digital data, the semiconductor device can be highly resistant to noise and is capable of performing arithmetic operation at high speed. Alternatively, the weight data may be analog data.

The memory circuit 350 is connected to the arithmetic circuit 360 through a wiring. The memory cells included in the memory circuit 350 each include an OS transistor. The wiring connecting the memory circuit 350 to the arithmetic circuit 360 serves as a wiring for transferring the weight data from the memory circuit 350 to the arithmetic circuit 360. In order for the weight data to be read from the memory circuit 350 to the wiring at high speed, or in order for energy consumed during charging and discharging to be reduced, the wiring is preferably short. That is, the wiring can be provided so as to extend in the z direction as shown by an arrow 351 in FIG. 5B. When the physical distance between the arithmetic circuit 360 and the memory circuit 350 is decreased, for example, a wiring distance can be shortened by stacking layers, parasitic capacitance generated in a signal line can be reduced and low power consumption can be achieved.

The arithmetic circuit 360 has a function of performing arithmetic processing such as a product-sum operation. Data input and output of the arithmetic circuit 360 are controlled by a control circuit 343 and a control circuit 344. The control circuit 343 and the control circuit 344 are also referred to as data input/output circuits.

The arithmetic circuit 360 performs a product-sum operation of input data input from the control circuit 343 and the weight data supplied from the memory circuit 350. The input data may be biological information sensed by the sensor portion 150. The obtained product-sum operation data is output to the control circuit 344. The input data and the weight data may be either analog data or digital data. Note that it is preferable that the input data and the weight data be digital data. Digital data is less likely to be affected by noise. Thus, digital data is suitable for arithmetic processing that requires a highly accurate arithmetic result.

When the arithmetic circuit 360 is formed using a Si transistor, the Si transistor can be provided with an OS transistor stacked thereover. In other words, the memory circuit 350 formed using an OS transistor can be stacked over the arithmetic circuit 360 that can be formed using a Si transistor. Thus, an area where the memory circuit 350 can be placed can be increased without increasing the circuit area. When a region where the memory circuit 350 is provided is over the substrate where the arithmetic circuit 360 is provided, a memory capacity required for the arithmetic processing in the accelerator 330 can be increased as compared with a case where the memory circuit 350 and the arithmetic circuit 360 are provided in the same layer. With increased memory capacity, the number of times of transfer of data used for arithmetic processing from an external memory device to the semiconductor device can be reduced, whereby the power consumption can be reduced.

<Memory Circuit>

Figure 6A:
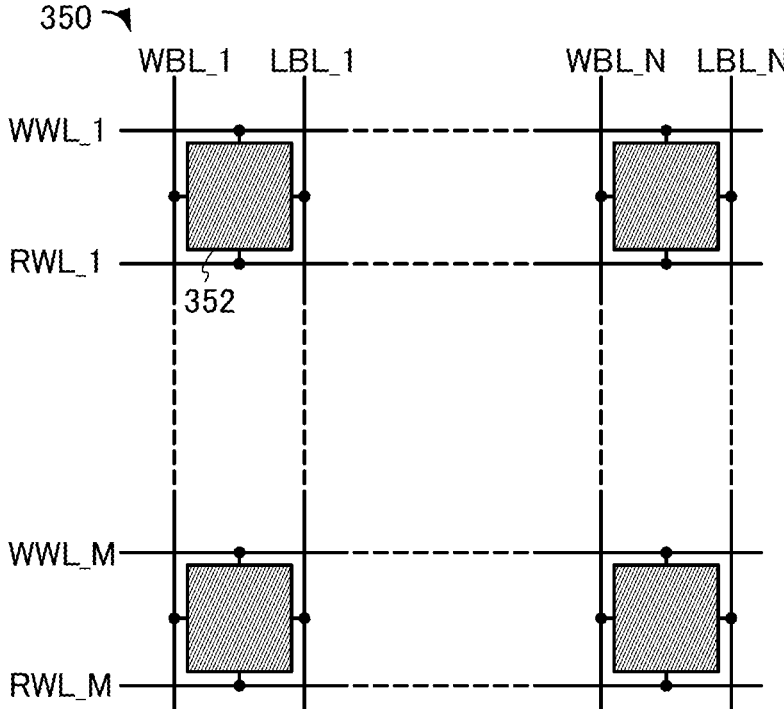
FIG. 6A and FIG. 6B are diagrams each illustrating a configuration example of a memory circuit.

A configuration example of a NOSRAM, which is a memory cell included in the memory circuit 350, is described. FIG. 6A shows write word lines WWL_1 to WWL_M, read word lines RWL_1 to RWL_M, write bit lines WBL_1 to WBL_N, and wirings LBL_1 to LBL_N, which are arranged in a matrix of M rows and N columns (M and N are natural numbers greater than or equal to 2). Memory cells 352 connected to the word lines and the bit lines are also shown.

Figure 6B:
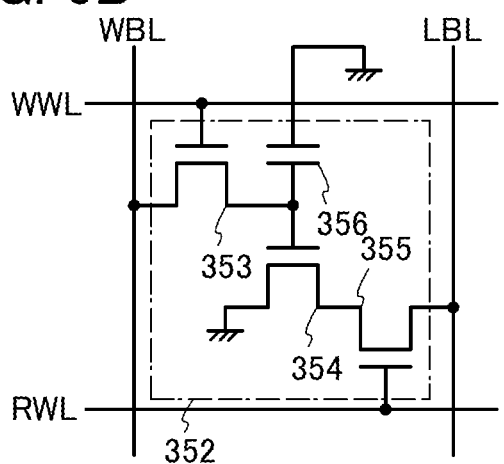

FIG. 6B is a diagram illustrating a circuit configuration example applicable to the memory cell 352. The memory cell 352 includes a transistor 353, a transistor 354, a transistor 355, and a capacitor 356.

One of a source and a drain of the transistor 353 is connected to the write bit line WBL. A gate of the transistor 353 is connected to the write word line WWL. The other of the source and the drain of the transistor 353 is connected to one electrode of the capacitor 356 and a gate of the transistor 354. One of a source and a drain of the transistor 354 and the other electrode of the capacitor 356 are connected to a wiring supplying a fixed potential such as a ground potential. The other of the source and the drain of the transistor 354 is connected to one of a source and a drain of the transistor 355. A gate of the transistor 355 is connected to the read word line RWL. The other of the source and the drain of the transistor 355 is connected to the wiring LBL. The wiring LBL is connected to the arithmetic circuit 360 (not shown) through a wiring extending in a direction substantially perpendicular to a substrate surface where a Si transistor of the arithmetic circuit 360 is provided.

The circuit configuration of the memory cell 352 shown as an example in FIG. 6B corresponds to a NOSRAM of a 3-transistor (3T) gain cell. The transistor 353 to the transistor 355 are OS transistors. An OS transistor has extremely low current that flows between a source and a drain in an off state, that is, leakage current. The NOSRAM can be used as a nonvolatile memory by retaining electric charge corresponding to data in the memory circuit, using characteristics of an extremely low leakage current.

<Arithmetic Circuit>

Figure 7:
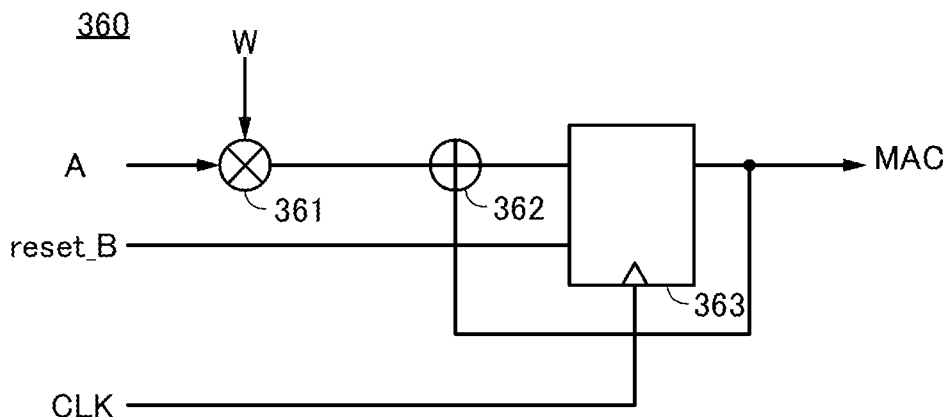
FIG. 7 is a diagram illustrating a configuration example of an arithmetic circuit.

FIG. 7 shows a specific configuration example of the arithmetic circuit 360. In FIG. 7, a configuration example of the arithmetic circuit 360 capable of performing a product-sum operation of weight data W and input data A is shown. A multiplier circuit 361, an adder circuit 362, and a register 363 are illustrated in FIG. 7. Data multiplied by the multiplier circuit 361 is input to the adder circuit 362. The output of the adder circuit 362 is retained in the register 363, and the data multiplied by the multiplier circuit 361 is added together by the adder circuit 362; thus, a product-sum operation is performed. The register 363 is controlled with a clock signal CLK and a reset signal reset_B. With such a configuration, output data MAC corresponding to the product-sum operation of the weight data W and the input data A can be obtained.

Operation Example

Next, an operation example of the semiconductor device in a case where the accelerator 330 executes part of arithmetic operation of a program executed by the CPU 310 is described.

Figure 8:
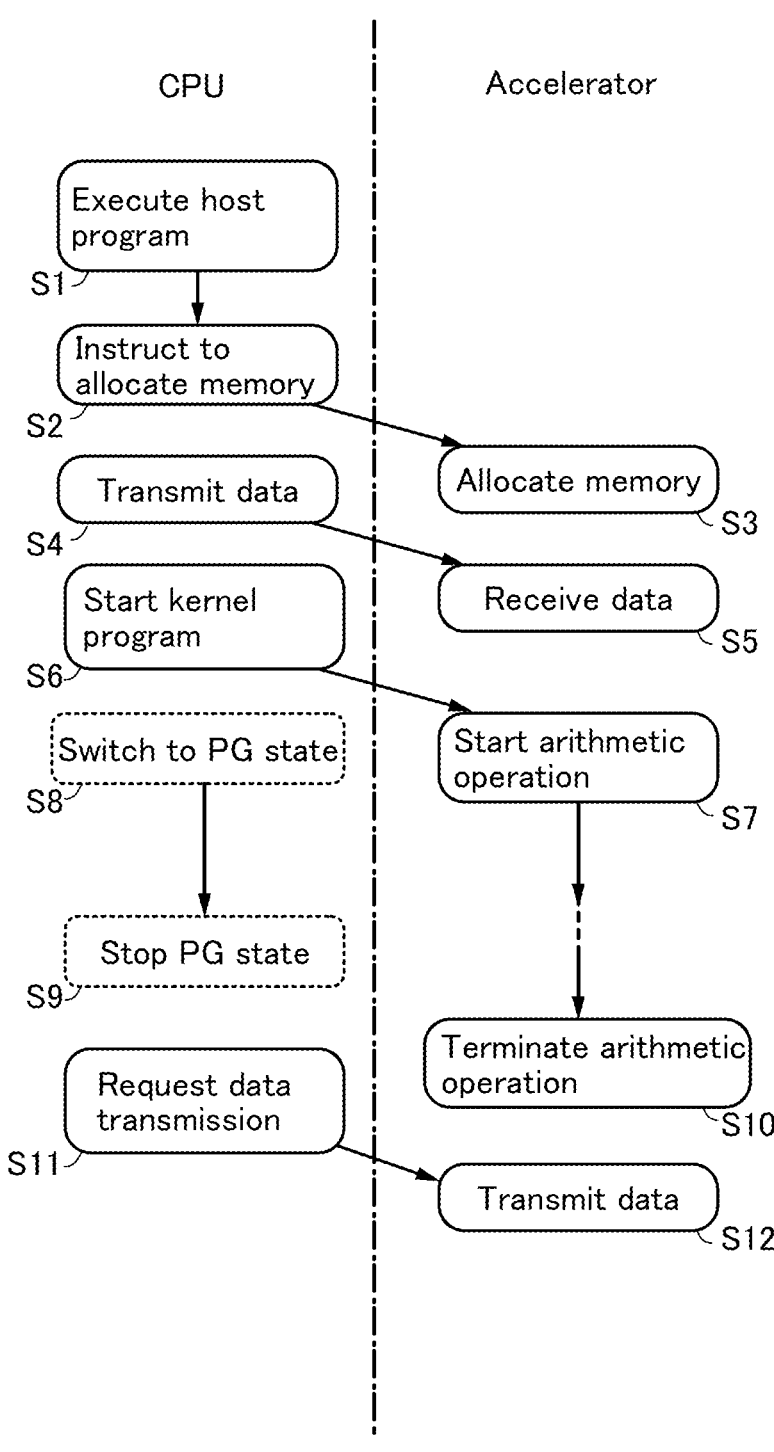
FIG. 8 is a diagram showing an operation example of a semiconductor device.

FIG. 8 illustrates an example of operation of the case where the accelerator executes part of arithmetic operation of a program executed by the CPU.

A host program is executed by the CPU (Execute host program; Step S1).

In the case where the CPU confirms an instruction to allocate, to a memory circuit (memory), a region for data needed in performing an arithmetic operation using the accelerator (Instruct to allocate memory; Step S2), the CPU allocates the region for the data to the memory circuit (memory) (Allocate memory; Step S3).

Next, the CPU transmits weight data that is data to be input from the main memory or an external storage device to the memory circuit (memory) (Transmit data; Step S4). The above-described memory circuit (memory) receives the weight data and stores the weight data in the region allocated in Step S2 (Receive data; Step S5).

In the case where the CPU confirms an instruction to start a kernel program (Start kernel program; Step S6), the accelerator starts execution of the kernel program (Start arithmetic operation; Step S7).

Immediately after the accelerator starts the execution of the kernel program, the CPU may be switched from the state of performing arithmetic operation to a PG (power gating) state (Switch to PG state; Step S8). In that case, just before the accelerator terminates the execution of the kernel program, the CPU is switched from the PG state to a state of performing arithmetic operation (Stop PG state; Step S9). By bringing the CPU into the PG state during the period from Step S8 to Step S9, the power consumption and heat generation of the arithmetic processing system as a whole can be inhibited.

When the accelerator terminates the execution of the kernel program, the output data is stored in a storage portion in the accelerator, which retains arithmetic operation results (Terminate arithmetic operation; Step S10).

After the execution of the kernel program is terminated, in the case where the CPU confirms an instruction to transmit the output data stored in the storage portion to the main memory or the external storage device (Request data transmission; Step S11), the above-described output data is transmitted to the main memory or the external storage device and stored in the main memory or the external storage device (Transmit data; Step S12).

By repeating the operations from Step S1 to Step S12 described above, part of the arithmetic operation executed by the CPU can be executed by the accelerator while the power consumption and heat generation of the CPU and the accelerator are inhibited. The semiconductor device of one embodiment of the present invention may have non-von Neumann architecture. The non-von Neumann architecture enables arithmetic processing to be performed with extremely low power consumption as compared with a von Neumann architecture, in which power consumption increases with increasing processing speed.

<CPU Core>

Next, an example of the CPU 310 including the CPU core 311 capable of power gating will be described.

Figure 9:
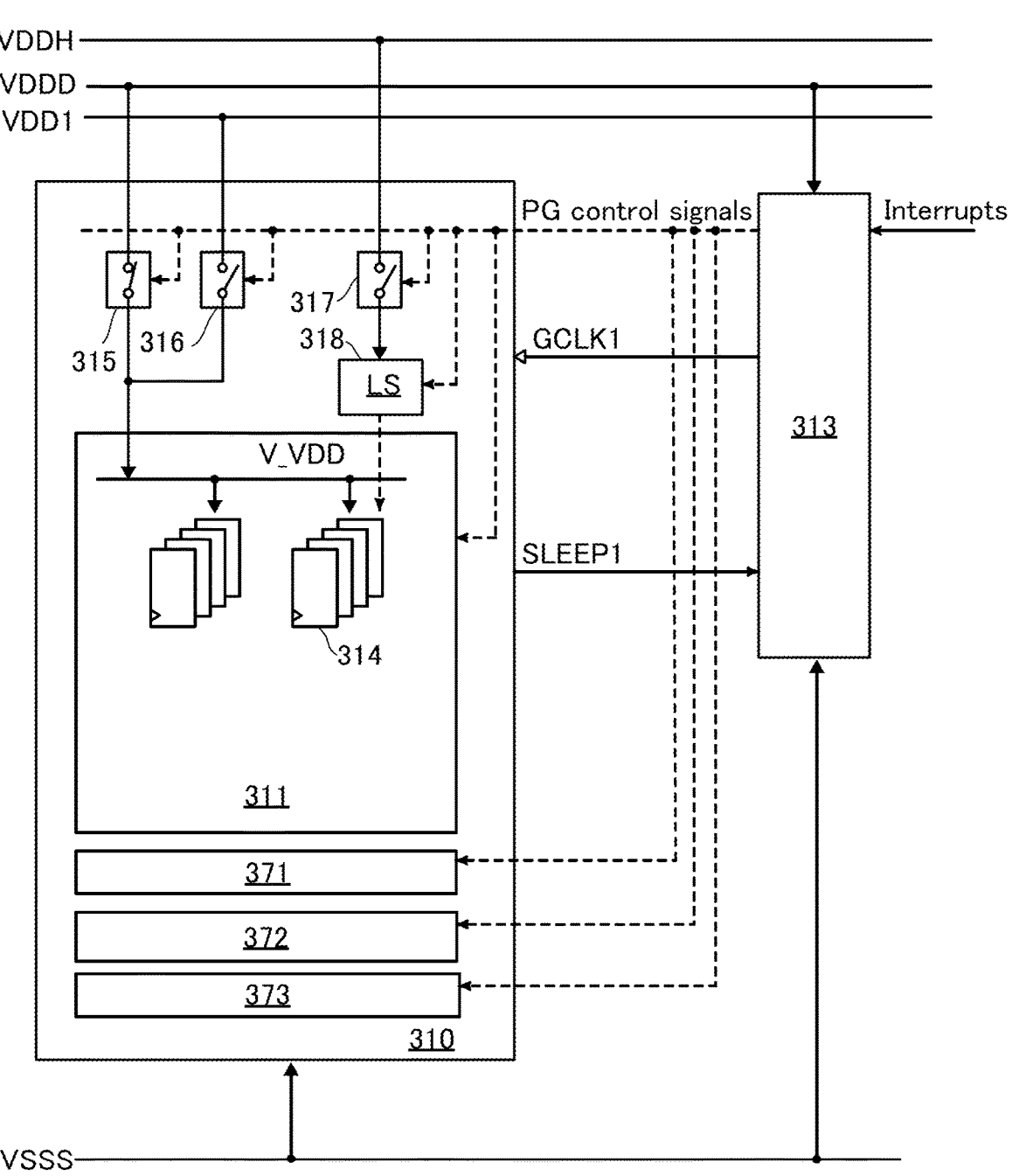
FIG. 9 is a diagram illustrating a configuration example of a CPU.

FIG. 9 shows a configuration example of the CPU 310. The CPU 310 includes the CPU core 311, an L1 (level 1) cache memory device (L1 Cache) 371, an L2 cache memory device (L2 Cache) 372, a bus interface portion (Bus I/F) 373, power switches 315 to 317, and a level shifter (LS) 318. The CPU core 311 includes a flip-flop 314.

Through the bus interface portion 373, the CPU core 311, the L1 cache memory device 371, and the L2 cache memory device 372 are mutually connected to one another.

A PMU 313 generates a clock signal GCLK1 and various PG (power gating) control signals in response to signals such as an interrupt signal (Interrupts) input from the outside and a signal SLEEP1 issued from the CPU 310. The clock signal GCLK1 and the PG control signal are input to the CPU 310. The PG control signal controls the power switches 315 to 317 and the flip-flop 314.

The power switches 315 and 316 control application of voltages VDDD and VDD1 to a virtual power supply line V_VDD (hereinafter referred to as a V_VDD line), respectively. The power switch 317 controls application of a voltage VDDH to the level shifter (LS) 318. A voltage VSSS is input to the CPU 310 and the PMU 313 without through the power switches. The voltage VDDD is input to the PMU 313 without through the power switches.

The voltages VDDD and VDD1 are drive voltages for a CMOS circuit. The voltage VDD1 is lower than the voltage VDDD and is a drive voltage in a sleep state. The voltage VDDH is a drive voltage for an OS transistor and is higher than the voltage VDDD.

The L1 cache memory device 371, the L2 cache memory device 372, and the bus interface portion 373 each include at least a power domain capable of power gating. The power domain capable of power gating is provided with one or a plurality of power switches. These power switches are controlled by the PG control signal.

The flip-flop 314 is used for a register. The flip-flop 314 is provided with a backup circuit. The flip-flop 314 will be described below.

Figure 10A:
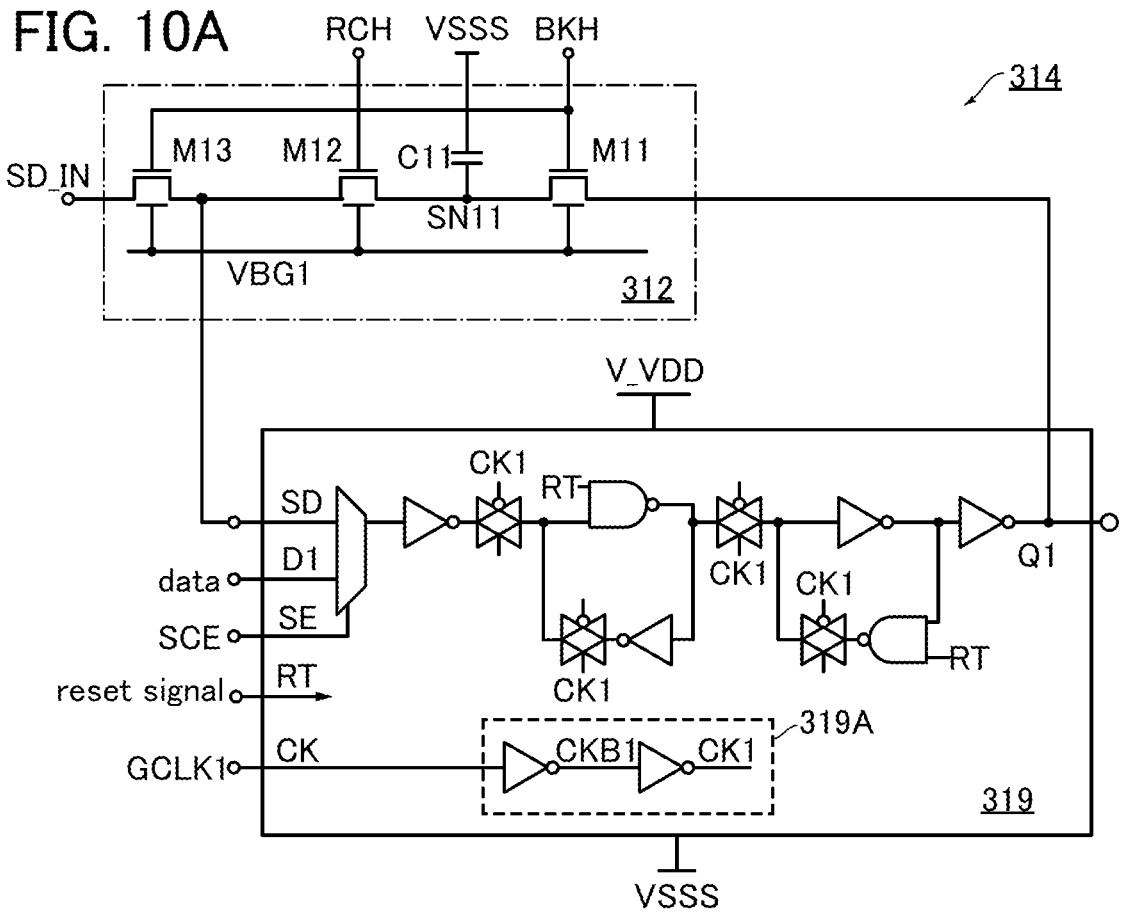
FIG. 10A and FIG. 10B are diagrams each illustrating a configuration example of a CPU.

FIG. 10A shows a circuit configuration example of the flip-flop 314. The flip-flop 314 includes a scan flip-flop 319 and a backup circuit 312.

The scan flip-flop 319 includes nodes D1, Q1, SD, SE, RT, and CK and a clock buffer circuit 319A.

The node D1 is a data input node, the node Q1 is a data output node, and the node SD is a scan test data input node. The node SE is a signal SCE input node. The node CK is a clock signal GCLK1 input node. The clock signal GCLK1 is input to the clock buffer circuit 319A. Respective analog switches in the scan flip-flop 319 are connected to nodes CK1 and CKB1 of the clock buffer circuit 319A. The node RT is a reset signal input node.

The signal SCE is a scan enable signal, which is generated in the PMU 313. The PMU 313 generates signals BK and RC. The level shifter 318 level-shifts the signals BK and RC to generate signals BKH and RCH. The signal BK is a backup signal and the signal RC is a recovery signal.

The circuit configuration of the scan flip-flop 319 is not limited to that in FIG. 10A. A scan flip-flop prepared in a standard circuit library can be applied.

The backup circuit 312 includes nodes SD_IN and SN11, transistors M11 to M13, and a capacitor C11.

The node SD_IN is a scan test data input node and is connected to the node Q1 of the scan flip-flop 319. The node SN11 is a retention node of the backup circuit 312. The capacitor C11 is a storage capacitor for retaining the voltage of the node SN11.

The transistor M11 controls continuity between the node Q1 and the node SN11. The transistor M12 controls continuity between the node SN11 and the node SD. The transistor M13 controls continuity between the node SD_IN and the node SD. The on/off of the transistors M11 and M13 is controlled by the signal BKH, and the on/off of the transistor M12 is controlled by the signal RCH.

The transistors M11 to M13 are OS transistors like the transistors 353 to 355 included in the above-described memory cell 352. The transistors M11 to M13 have back gates in the illustrated configuration. The back gates of the transistors M11 to M13 are connected to a power supply line for supplying a voltage VBG1.

At least the transistors M11 and M12 are preferably OS transistors. Because of extremely low off-state current, which is a feature of the OS transistor, a decrease in the voltage of the node SN11 can be suppressed and almost no power is consumed to retain data; therefore, the backup circuit 312 has a nonvolatile characteristic. Data is rewritten by charging and discharging of the capacitor C11; hence, there is theoretically no limitation on rewrite cycles of the backup circuit 312, and data can be written and read out with low power.

Figure 10B:
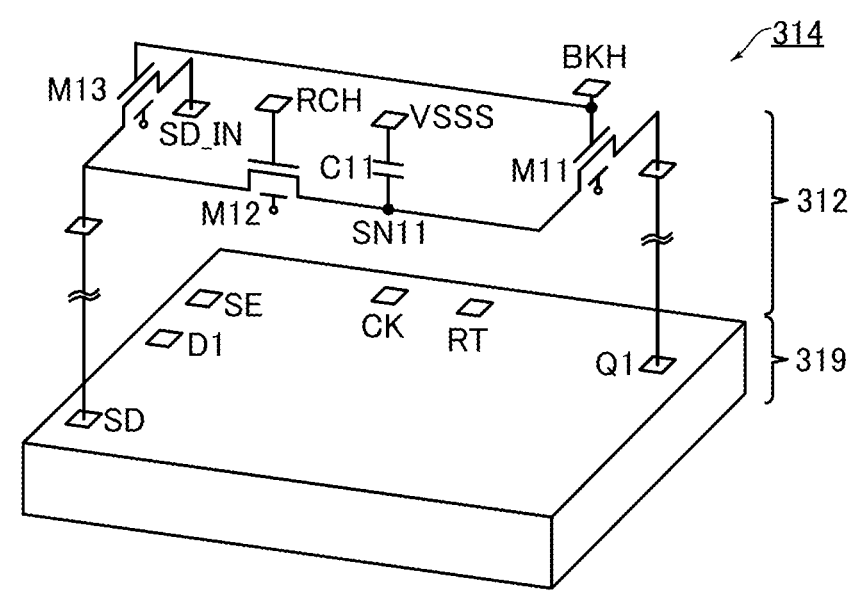

It is very preferable that all of the transistors in the backup circuit 312 be OS transistors. As shown in FIG. 10B, the backup circuit 312 can be stacked on the scan flip-flop 319 configured with a silicon CMOS circuit.

The number of elements in the backup circuit 312 is much smaller than the number of elements in the scan flip-flop 319; thus, there is no need to change the circuit configuration and layout of the scan flip-flop 319 in order to stack the backup circuit 312. That is, the backup circuit 312 is a backup circuit that has very broad utility. In addition, the backup circuit 312 can be provided in a region where the scan flip-flop 319 is formed; thus, even when the backup circuit 312 is incorporated, an increase in area occupied by the flip-flop 314 can be zero. Thus, the backup circuit 312 is provided in the flip-flop 314, whereby power gating of the CPU core 311 is enabled. The power gating of the CPU core 311 is enabled with high efficiency owing to little power necessary for the power gating.

When the backup circuit 312 is provided, parasitic capacitance due to the transistor M11 is added to the node Q1. However, the parasitic capacitance is lower than parasitic capacitance due to a logic circuit connected to the node Q1; thus, there is no influence of the parasitic capacitance on the operation of the scan flip-flop 319. That is, even when the backup circuit 312 is provided, the performance of the flip-flop 314 does not substantially decrease.

The CPU core 311 can be set to a clock gating state, a power gating state, or a resting state as a low power consumption state. The PMU 313 selects the low power consumption mode of the CPU core 311 on the basis of the interrupt signal, the signal SLEEP1, and the like. For example, in the case of transition from a normal operation state to a clock gating state, the PMU 313 stops generation of the clock signal GCLK1.

For example, in the case of transition from a normal operation state to a resting state, the PMU 313 performs voltage and/or frequency scaling. For example, when the voltage scaling is performed, the PMU 313 turns off the power switch 315 and turns on the power switch 316 to input the voltage VDD1 to the CPU core 311. The voltage VDD1 is a voltage at which data in the scan flip-flop 319 is not lost. When the frequency scaling is performed, the PMU 313 reduces the frequency of the clock signal GCLK1.

In the case where the CPU core 311 transitions from a normal operation state to a power gating state, data in the scan flip-flop 319 is backed up to the backup circuit 312. When the CPU core 311 is returned from the power gating state to the normal operation state, recovery operation of writing back data in the backup circuit 312 to the scan flip-flop 319 is performed.

Figure 11:
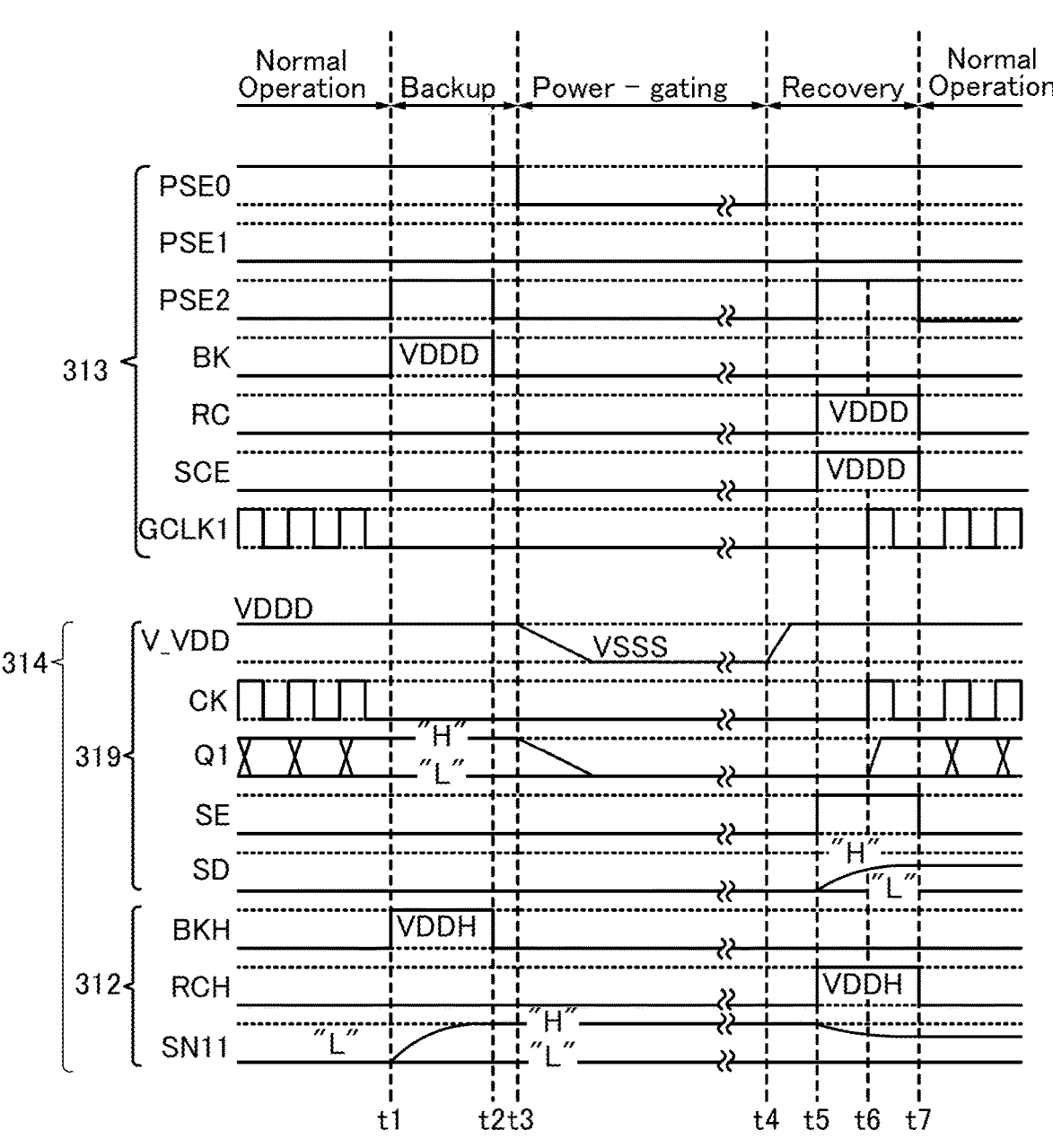
FIG. 11 is a diagram illustrating a configuration example of a CPU.

FIG. 11 illustrates an example of the power gating sequence of the CPU core 311. Note that in FIGS. 11, t1 to t7 represent the time. Signals PSE0 to PSE2 are control signals of the power switches 315 to 317, which are generated in the PMU 313. When the signal PSE0 is at "H"/"L", the power switch 315 is on/off. The same applies also to signals PSE1 and PSE2.

Until Time t1, a normal operation is performed. The power switch 315 is on, and the voltage VDDD is input to the CPU core 311. The scan flip-flop 319 performs the normal operation. At this time, the level shifter 318 does not need to be operated; thus, the power switch 317 is off and the signals SCE, BK, and RC are each at "L". The node SE is at "L"; thus, the scan flip-flop 319 stores data in the node D1. Note that in the example of FIG. 11, the node SN11 of the backup circuit 312 is at "L" at Time t1.

A backup operation is described. At the operation time t1, the PMU 313 stops the clock signal GCLK1 and sets the signals PSE2 and BK at "H". The level shifter 318 becomes active and outputs the signal BKH at "H" to the backup circuit 312.

The transistor M11 in the backup circuit 312 is turned on, and data in the node Q1 of the scan flip-flop 319 is written to the node SN11 of the backup circuit 312. When the node Q1 of the scan flip-flop 319 is at "L", the node SN11 remains at "L", whereas when the node Q1 is at "H", the node SN11 becomes "H".

The PMU 313 sets the signals PSE2 and BK at "L" at Time t2 and sets the signal PSE0 at "L" at Time t3. The state of the CPU core 311 transitions to a power gating state at Time t3. Note that at the timing when the signal BK falls, the signal PSE0 may fall.

A power-gating operation is described. When the signal PSE0 is set at "L, data in the node Q1 is lost because the voltage of the V_VDD line decreases. The node SN11 retains data that is stored in the node Q1 at Time t3.

A recovery operation is described. When the PMU 313 sets the signal PSE0 at "H" at Time t4, the power gating state transitions to a recovery state. Charging of the V_VDD line starts, and the PMU 313 sets the signals PSE2, RC, and SCE at "H" in a state where the voltage of the V_VDD line becomes VDDD (at Time t5).

The transistor M12 is turned on, and electric charge in capacitor C11 is distributed to the node SN11 and the node SD. When the node SN11 is at "H", the voltage of the node SD increases. The node SE is at "H", and thus, data in the node SD is written to a latch circuit on the input side of the scan flip-flop 319. When the clock signal GCLK1 is input to the node CK at Time t6, data in the latch circuit on the input side is written to the node Q1. That is, data in the node SN11 is written to the node Q1.

When the PMU 313 sets the signals PSE2, SCE, and RC at "L" at Time t7, the recovery operation is terminated.

The backup circuit 312 using an OS transistor is extremely suitable for normally-off computing because both dynamic power consumption and static power consumption are low.

Note that the CPU 310 including the CPU core 311 including the backup circuit 312 using an OS transistor can be referred to as NoffCPU (registered trademark). The NoffCPU includes a nonvolatile memory, and power supply to the NoffCPU can be stopped during the time when the NoffCPU does not need to operate. Even when the flip-flop 314 is mounted, a decrease in the performance and an increase in the dynamic power of the CPU core 311 can be made hardly to occur.

Note that the CPU core 311 may include a plurality of power domains capable of power gating. In the plurality of power domains, one or a plurality of power switches for controlling voltage input are provided. In addition, the CPU core 311 may include one or a plurality of power domains where power gating is not performed. For example, the power domain where power gating is not performed may be provided with a power gating control circuit for controlling the flip-flop 314 and the power switches 315 to 317.

Note that the application of the flip-flop 314 is not limited to the CPU 310. In the CPU 310, the flip-flop 314 can be used as the register provided in a power domain capable of power gating.

The configuration, structure, method, or the like described in this embodiment can be used in combination with the configuration, structure, method, or the like described in other embodiments and the like as appropriate.

Embodiment 2

In this embodiment, structure examples of transistors that can be used in the semiconductor device described in the above embodiment are described. As an example, a structure in which transistors having different electrical characteristics are stacked is described. With the structure, the flexibility in design of the semiconductor device can be increased. Stacking transistors having different electrical characteristics can increase the degree of integration of the semiconductor device.

Figure 12:
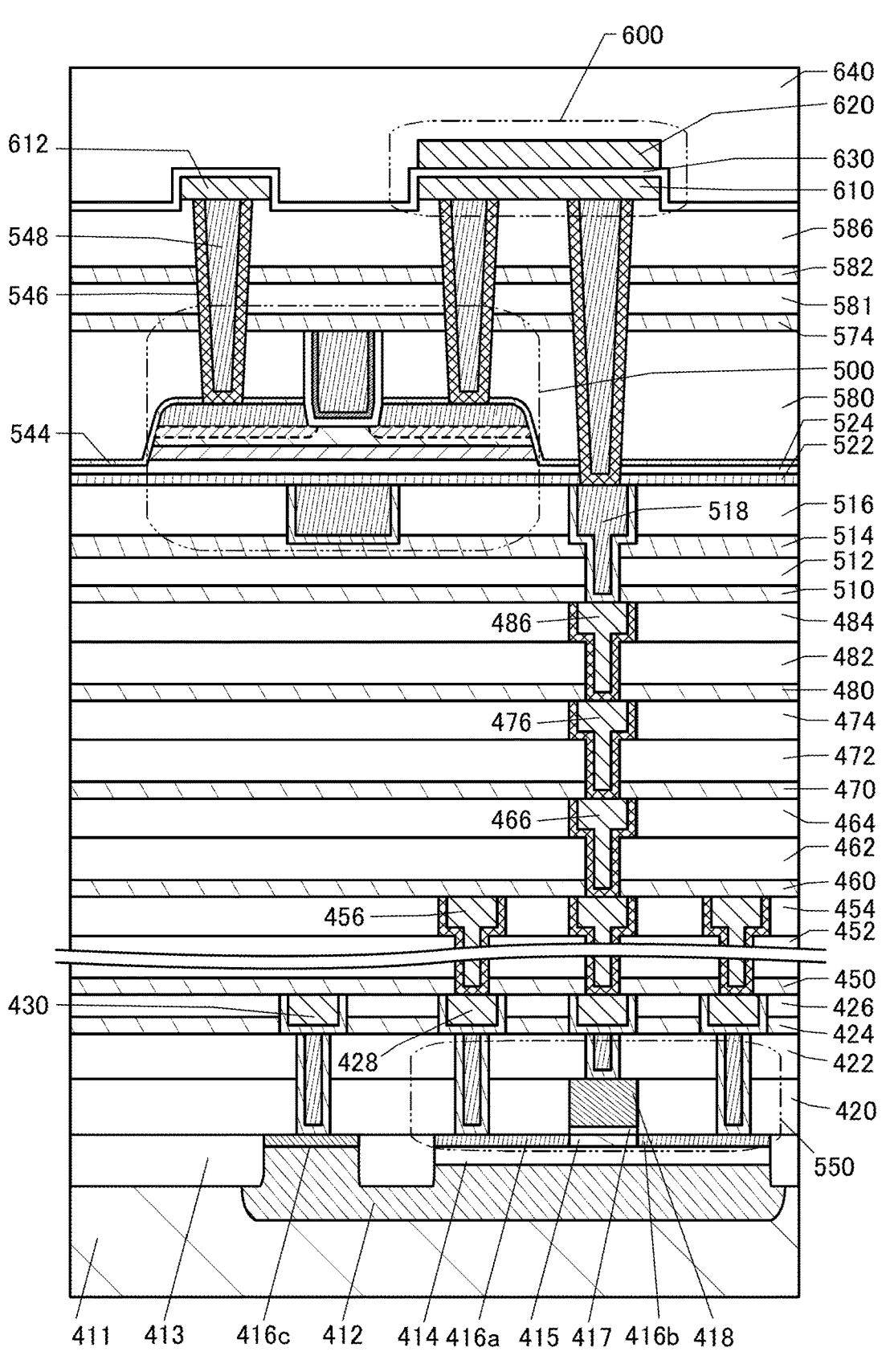
FIG. 12 is a diagram showing a structure example of a semiconductor device.
Figure 13A:
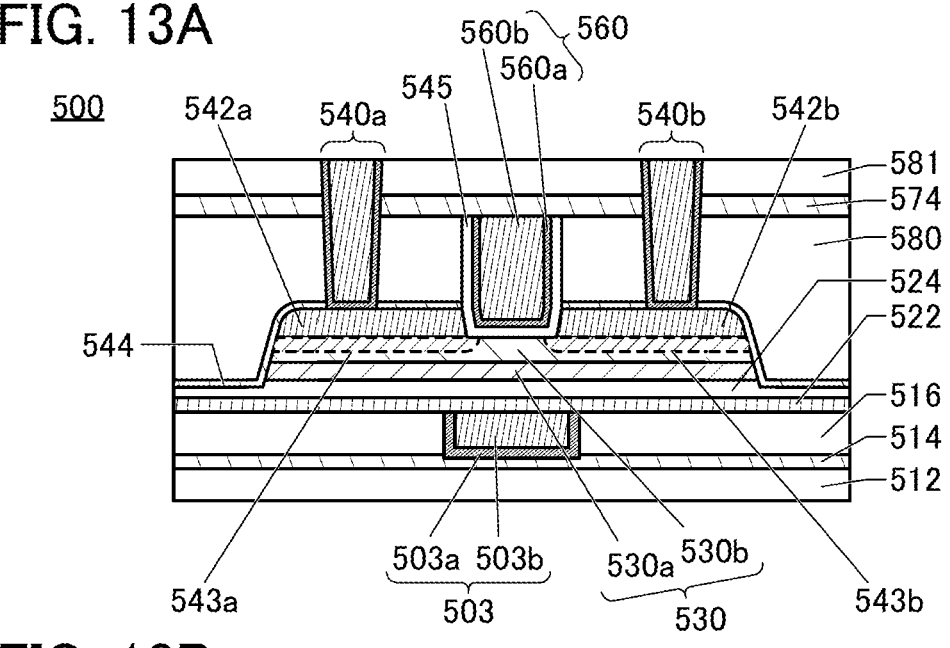
FIG. 13A and FIG. 13B are diagrams each illustrating a structure example of a transistor.
Figure 13B:
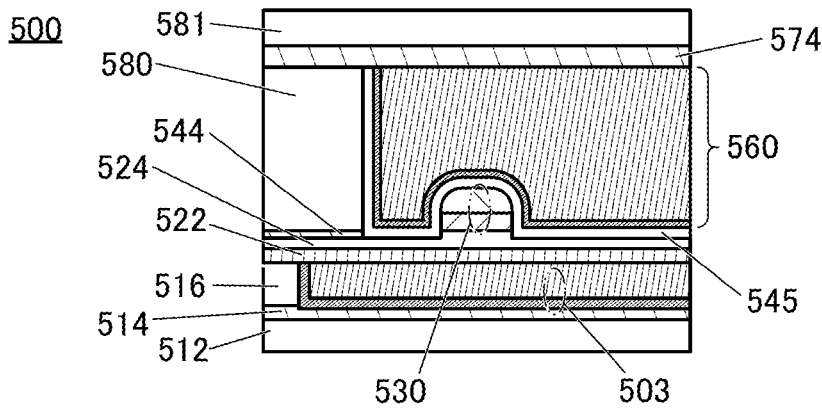

FIG. 12 illustrates part of a cross-sectional structure of a semiconductor device. The semiconductor device illustrated in FIG. 12 includes a transistor 550, a transistor 500, and a capacitor 600. FIG. 13A is a cross-sectional view of the transistor 500 in the channel length direction, and FIG. 13B is a cross-sectional view of the transistor 500 in the channel width direction. For example, the transistor 500 corresponds to an OS transistor included in the memory circuit 350 described in the above embodiment, that is, a transistor including an oxide semiconductor in its channel formation region. The transistor 550 corresponds to a Si transistor included in the arithmetic circuit 360 described in the above embodiment, that is, a transistor including silicon in its channel formation region. The capacitor 600 corresponds to a capacitor included in the memory circuit 350.

The transistor 500 is an OS transistor. The off-state current of an OS transistor is extremely low. Accordingly, data voltage or charge written to a storage node through the transistor 500 can be retained for a long time. In other words, power consumption of the semiconductor device can be reduced because the storage node has a low frequency of refresh operation or requires no refresh operation.

In FIG. 12, the transistor 500 is provided above the transistor 550, and the capacitor 600 is provided above the transistor 550 and the transistor 500.

The transistor 550 is provided on a substrate 411. The substrate 411 is a p-type silicon substrate, for example. The substrate 411 may be an n-type silicon substrate. An oxide layer 414 is preferably an insulating layer formed with an oxide buried (Burried oxide) into the substrate 411 (the insulating layer is also referred to as a BOX layer), for example, is a silicon oxide. The transistor 550 is formed using a single crystal silicon provided over the substrate 411 with the oxide layer 414 sandwiched therebetween; that is, the transistor 550 is provided on an SOI (Silicon On Insulator) substrate. Thus, in this embodiment, the transistor 550 is a Si transistor.

The substrate 411 included in the SOI substrate is provided with an insulator 413 serving as an element isolation layer. The substrate 411 includes a well region 412. The well region 412 is a region to which n-type or p-type conductivity is imparted in accordance with the conductivity of the transistor 550. The single-crystal silicon in the SOI substrate is provided with a semiconductor region 415 and a low-resistance region 416a and a low-resistance region 416b each of which function as a source region or a drain region. A low-resistant region 416c is provided over the well region 412.

The transistor 550 can be provided so as to overlap with the well region 412 to which an impurity element imparting conductivity is added. The well region 412 can function as a bottom-gate electrode of the transistor 550 by independently changing the potential of the low-resistance region 416c. Moreover, the threshold voltage of the transistor 550 can be controlled. In particular, when a negative potential is applied to the well region 412, the threshold voltage of the transistor 550 can be further increased, and the off-state current can be reduced. Thus, a negative potential is applied to the well region 412, so that a drain current when a potential applied to a gate electrode of the Si transistor is 0 V can be reduced. As a result, power consumption of the semiconductor device including the transistor 550 can be reduced, and the arithmetic efficiency can be improved.

The transistor 550 preferably has a structure in which the top surface and the side surface in the channel width direction of the semiconductor layer are covered with a conductor 418 with an insulator 417 therebetween, that is, a Fin-type structure. Such a Fin-type transistor 550 can have an increased effective channel width, and thus have improved on-state characteristics. In addition, since contribution of an electric field of a gate electrode can be increased, the off-state characteristics of the transistor 550 can be improved.

Note that the transistor 550 can be either a p-channel transistor or an n-channel transistor.

The conductor 418 sometimes functions as a first gate (also referred to as a top gate) electrode. In addition, the well region 412 sometimes functions as a second gate (also referred to as a bottom gate) electrode. In that case, a potential applied to the well region 412 can be controlled through the low-resistance region 416c.

A region of the semiconductor region 415 where a channel is formed, a region in the vicinity thereof, the low-resistance region 416a and the low-resistance region 416b each functioning as a source region or a drain region, the low-resistance region 416c connected to an electrode controlling a potential of the well region 412, and the like preferably contain a semiconductor such as a silicon-based semiconductor, and preferably contain single crystal silicon. Alternatively, the regions may be formed using a material containing Ge (germanium), SiGe (silicon germanium), GaAs (gallium arsenide), GaAlAs (gallium aluminum arsenide), or the like. A structure may be employed in which silicon whose effective mass is controlled by applying stress to the crystal lattice and changing the lattice spacing is used. Alternatively, the transistor 550 may be a HEMT (High Electron Mobility Transistor) with use of GaAs and GaAlAs, or the like.

The well region 412, the low-resistance region 416a, the low-resistance region 416b, and the low-resistance region 416c contain an element which imparts n-type conductivity, such as arsenic or phosphorus, or an element which imparts p-type conductivity, such as boron, in addition to the semiconductor material used for the semiconductor region 415.

For the conductor 418 functioning as a gate electrode, a semiconductor material such as silicon containing the element which imparts n-type conductivity, such as arsenic or phosphorus, or the element which imparts p-type conductivity, such as boron, or a conductive material such as a metal material, an alloy material, or a metal oxide material can be used. Alternatively, silicide such as nickel silicide may be used for the conductor 418.

Note that since the work function of a conductor depends on the material of the conductor, the threshold voltage of the transistor can be adjusted by selecting the material of the conductor. Specifically, it is preferable to use a material such as titanium nitride or tantalum nitride for the conductor. Moreover, in order to ensure both conductivity and embeddability, it is preferable to use stacked layers of metal materials such as tungsten and aluminum for the conductor, and it is particularly preferable to use tungsten in terms of heat resistance.

To form each of the low-resistance region 416a, the low-resistance region 416b, and the low-resistance region 416c, another conductor, for example, silicide such as nickel silicide may be stacked. With this structure, the conductivity of the region functioning as an electrode can be increased. At this time, an insulator functioning as a sidewall spacer (also referred to as a sidewall insulating layer) may be provided at the side surface of the conductor 418 functioning as a gate electrode and the side surface of the insulator 417 functioning as a gate insulating film. This structure can prevent the conductor 418 and the low-resistance region 416a and the low-resistance region 416b from being brought into a conduction state.

An insulator 420, an insulator 422, an insulator 424, and an insulator 426 are stacked in this order to cover the transistor 550.

For the insulator 420, the insulator 422, the insulator 424, and the insulator 426, silicon oxide, silicon oxynitride, silicon nitride oxide, silicon nitride, aluminum oxide, aluminum oxynitride, aluminum nitride oxide, aluminum nitride, or the like is used, for example.

Note that in this specification, silicon oxynitride refers to a material that contains oxygen at a higher proportion than nitrogen in its composition, and silicon nitride oxide refers to a material that contains nitrogen at a higher proportion than oxygen in its composition. Furthermore, in this specification, aluminum oxynitride refers to a material that contains oxygen at a higher proportion than nitrogen in its composition, and aluminum nitride oxide refers to a material that contains nitrogen at a higher proportion than oxygen in its composition.

The insulator 422 may have a function of a planarization film for eliminating a level difference caused by the transistor 550 or the like provided below the insulator 422. For example, a top surface of the insulator 422 may be planarized by planarization treatment using a chemical mechanical polishing (CMP) method or the like to improve planarity.

In addition, for the insulator 424, it is preferable to use a film having a barrier property that prevents diffusion of hydrogen or impurities from the substrate 411, the transistor 550, or the like into a region where the transistor 500 is provided.

For the film having a barrier property against hydrogen, silicon nitride formed by a CVD method can be used, for example. Here, diffusion of hydrogen into a semiconductor element including an oxide semiconductor, such as the transistor 500, degrades the characteristics of the semiconductor element in some cases. Therefore, a film that inhibits hydrogen diffusion is preferably provided between the transistor 500 and the transistor 550. The film that inhibits hydrogen diffusion is specifically a film from which a small amount of hydrogen is released.

The amount of released hydrogen can be analyzed by thermal desorption spectroscopy (TDS) or the like, for example. The amount of hydrogen released from the insulator 424 that is converted into hydrogen atoms per area of the insulator 424 is less than or equal to $10 \times 10^{15}$ atoms/cm$^2$, preferably less than or equal to $5 \times 10^{15}$ atoms/cm$^2$, in the TDS analysis in a film-surface temperature range of 50° C. to 500° C., for example.

Note that the permittivity of the insulator 426 is preferably lower than that of the insulator 424. For example, the dielectric constant of the insulator 426 is preferably lower than 4, further preferably lower than 3. The dielectric constant of the insulator 426 is, for example, preferably 0.7 times or less, further preferably 0.6 times or less the dielectric constant of the insulator 424. When a material with a low permittivity is used for an interlayer film, parasitic capacitance generated between wirings can be reduced.

A conductor 428, a conductor 430, and the like that are connected to the capacitor 600 or the transistor 500 are embedded in the insulator 420, the insulator 422, the insulator 424, and the insulator 426. Note that the conductor 428 and the conductor 430 each have a function of a plug or a wiring. Furthermore, a plurality of conductors functioning as plugs or wirings are collectively denoted by the same reference numeral in some cases. Moreover, in this specification and the like, a wiring and a plug connected to the wiring may be a single component. That is, part of a conductor functions as a wiring in some cases and part of a conductor functions as a plug in other cases.

As a material for each of the plugs and wirings (the conductor 428, the conductor 430, and the like), a single layer or a stacked layer of a conductive material such as a metal material, an alloy material, a metal nitride material, or a metal oxide material can be used. It is preferable to use a high-melting-point material that has both heat resistance and conductivity, such as tungsten or molybdenum, and it is preferable to use tungsten. Alternatively, it is preferable to use a low-resistance conductive material such as aluminum or copper. The use of a low-resistance conductive material can reduce wiring resistance.

A wiring layer may be provided over the insulator 426 and the conductor 430. For example, in FIG. 12, an insulator 450, an insulator 452, and an insulator 454 are provided to be stacked in this order. Furthermore, a conductor 456 is formed in the insulator 450, the insulator 452, and the insulator 454. The conductor 456 has a function of a plug or a wiring that is connected to the transistor 550. Note that the conductor 456 can be provided using a material similar to those for the conductor 428 and the conductor 430.

Note that for example, like the insulator 424, the insulator 450 is preferably formed using an insulator having a barrier property against hydrogen. Furthermore, the conductor 456 preferably contains a conductor having a barrier property against hydrogen. In particular, the conductor having a barrier property against hydrogen is formed in an opening portion of the insulator 450 having a barrier property against hydrogen. With this structure, the transistor 550 and the transistor 500 can be separated by a barrier layer, so that diffusion of hydrogen from the transistor 550 into the transistor 500 can be inhibited.

Note that for the conductor having a barrier property against hydrogen, tantalum nitride is preferably used, for example. In addition, by stacking tantalum nitride and tungsten, which has high conductivity, the diffusion of hydrogen from the transistor 550 can be inhibited while the conductivity as a wiring is kept. In that case, a structure in which a tantalum nitride layer having a barrier property against hydrogen is in contact with the insulator 450 having a barrier property against hydrogen is preferable.

A wiring layer may be provided over the insulator 454 and the conductor 456. For example, in FIG. 12, an insulator 460, an insulator 462, and an insulator 464 are provided to be stacked in this order. Furthermore, a conductor 466 is formed in the insulator 460, the insulator 462, and the insulator 464. The conductor 466 has a function of a plug or a wiring. Note that the conductor 466 can be provided using a material similar to those for the conductor 428 and the conductor 430.

Note that for example, like the insulator 424, the insulator 460 is preferably formed using an insulator having a barrier property against hydrogen. Furthermore, the conductor 466 preferably contains a conductor having a barrier property against hydrogen. In particular, the conductor having a barrier property against hydrogen is formed in an opening portion of the insulator 460 having a barrier property against hydrogen. With this structure, the transistor 550 and the transistor 500 can be separated by a barrier layer, so that diffusion of hydrogen from the transistor 550 into the transistor 500 can be inhibited.

A wiring layer may be provided over the insulator 464 and the conductor 466. For example, in FIG. 12, an insulator 470, an insulator 472, and an insulator 474 are provided to be stacked in this order. Furthermore, a conductor 476 is formed in the insulator 470, the insulator 472, and the insulator 474. The conductor 476 has a function of a plug or a wiring. Note that the conductor 476 can be provided using a material similar to those for the conductor 428 and the conductor 430.

Note that for example, like the insulator 424, the insulator 470 is preferably formed using an insulator having a barrier property against hydrogen. Furthermore, the conductor 476 preferably contains a conductor having a barrier property against hydrogen. In particular, the conductor having a barrier property against hydrogen is formed in an opening portion of the insulator 470 having a barrier property against hydrogen. With this structure, the transistor 550 and the transistor 500 can be separated by a barrier layer, so that diffusion of hydrogen from the transistor 550 into the transistor 500 can be inhibited.

A wiring layer may be provided over the insulator 474 and the conductor 476. For example, in FIG. 12, an insulator 480, an insulator 482, and an insulator 484 are provided to be stacked in this order. Furthermore, a conductor 486 is formed in the insulator 480, the insulator 482, and the insulator 484. The conductor 486 has a function of a plug or a wiring. Note that the conductor 486 can be provided using a material similar to those for the conductor 428 and the conductor 430.

Note that for example, like the insulator 424, the insulator 480 is preferably formed using an insulator having a barrier property against hydrogen. Furthermore, the conductor 486 preferably contains a conductor having a barrier property against hydrogen. In particular, the conductor having a barrier property against hydrogen is formed in an opening portion of the insulator 480 having a barrier property against hydrogen. With this structure, the transistor 550 and the transistor 500 can be separated by a barrier layer, so that diffusion of hydrogen from the transistor 550 into the transistor 500 can be inhibited.

Although the wiring layer including the conductor 456, the wiring layer including the conductor 466, the wiring layer including the conductor 476, and the wiring layer including the conductor 486 are described above, the semiconductor device of this embodiment is not limited thereto. Three or less wiring layers that are similar to the wiring layer including the conductor 456 may be provided, or five or more wiring layers that are similar to the wiring layer including the conductor 456 may be provided.

An insulator 510, an insulator 512, an insulator 514, and an insulator 516 are provided to be stacked in this order over the insulator 484. A substance having a barrier property against oxygen or hydrogen is preferably used for any of the insulator 510, the insulator 512, the insulator 514, and the insulator 516.

For example, for the insulator 510 and the insulator 514, it is preferable to use a film having a barrier property against hydrogen or impurities diffused from the substrate 411, a region where the transistor 550 is provided, or the like into the region where the transistor 500 is provided. Therefore, a material similar to that for the insulator 424 can be used.

For the film having a barrier property against hydrogen, silicon nitride deposited by a CVD method can be used, for example. Here, diffusion of hydrogen into a semiconductor element including an oxide semiconductor, such as the transistor 500, degrades the characteristics of the semiconductor element in some cases. Therefore, a film that inhibits hydrogen diffusion is preferably provided between the transistor 500 and the transistor 550.

In addition, for the film having a barrier property against hydrogen, a metal oxide such as aluminum oxide, hafnium oxide, or tantalum oxide is preferably used for the insulator 510 and the insulator 514, for example.

In particular, aluminum oxide has an excellent blocking effect that prevents the passage of both oxygen and impurities such as hydrogen and moisture which are factors of change in electrical characteristics of the transistor. Accordingly, aluminum oxide can prevent mixing of impurities such as hydrogen and moisture into the transistor 500 in the manufacturing process and after the manufacturing of the transistor. In addition, release of oxygen from the oxide included in the transistor 500 can be inhibited. Therefore, aluminum oxide is suitably used for a protective film of the transistor 500.

In addition, for the insulator 512 and the insulator 516, a material similar to that for the insulator 420 can be used, for example. Furthermore, when a material with a relatively low permittivity is used for these insulators, parasitic capacitance generated between wirings can be reduced. A silicon oxide film, a silicon oxynitride film, or the like can be used for the insulator 512 and the insulator 516, for example.

Furthermore, a conductor 518, a conductor included in the transistor 500 (a conductor 503 for example), and the like are embedded in the insulator 510, the insulator 512, the insulator 514, and the insulator 516. Note that the conductor 518 has a function of a plug or a wiring that is connected to the capacitor 600 or the transistor 550. The conductor 518 can be provided using a material similar to those for the conductor 428 and the conductor 430.

In particular, the conductor 518 in a region in contact with the insulator 510 and the insulator 514 is preferably a conductor having a barrier property against oxygen, hydrogen, and water. With this structure, the transistor 550 and the transistor 500 can be separated by a layer having a barrier property against oxygen, hydrogen, and water; thus, diffusion of hydrogen from the transistor 550 into the transistor 500 can be inhibited.

The transistor 500 is provided above the insulator 516.

As illustrated in FIG. 13A and FIG. 13B, the transistor 500 includes the conductor 503 positioned to be embedded in the insulator 514 and the insulator 516; an insulator 522 positioned over the insulator 516 and the conductor 503; an insulator 524 positioned over the insulator 522; an oxide 530*a* positioned over the insulator 524; an oxide 530*b* positioned over the oxide 530*a*; a conductor 542*a* and a conductor 542*b* positioned apart from each other over the oxide 530*b*; an insulator 580 that is positioned over the conductor 542*a* and the conductor 542*b* and is provided with an opening formed to overlap with a region between the conductor 542*a* and the conductor 542*b*; an insulator 545 positioned on a bottom surface and a side surface of an opening; and a conductor 560 positioned on a formation surface of the insulator 545.

In addition, as illustrated in FIG. 13A and FIG. 13B, an insulator 544 is preferably positioned between the insulator 580 and the oxide 530*a*, the oxide 530*b*, the conductor 542*a*, and the conductor 542*b*. Furthermore, as illustrated in FIG. 13A and FIG. 13B, the conductor 560 preferably includes a conductor 560*a* provided on an inner side than the insulator 545 and a conductor 560*b* provided to be embedded on the inner side of the conductor 560*a*. Moreover, as illustrated in FIG. 13A and FIG. 13B, an insulator 574 is preferably positioned over the insulator 580, the conductor 560, and the insulator 545.

Note that in this specification and the like, the oxide 530*a* and the oxide 530*b* are sometimes collectively referred to as an oxide 530.

Note that although a structure of the transistor 500 in which two layers of the oxide 530*a* and the oxide 530*b* are stacked in a region where a channel is formed and its vicinity is illustrated, the present invention is not limited thereto. For example, it is possible to employ a structure in which a single layer of the oxide 530*b* or a stacked-layer structure of three or more layers is provided.

Furthermore, although the conductor 560 is illustrated to have a stacked-layer structure of two layers in the transistor 500, the present invention is not limited thereto. For example, the conductor 560 may have a single-layer structure or a stacked-layer structure of three or more layers. Note that the transistor 500 illustrated in FIG. 12, FIG. 13A, and FIG. 13B is an example, and the structures are not limited thereto; an appropriate transistor can be used in accordance with a circuit configuration or a driving method.

Here, the conductor 560 functions as a gate electrode of the transistor, and the conductor 542*a* and the conductor 542*b* each function as a source electrode or a drain electrode. As described above, the conductor 560 is formed to be embedded in the opening of the insulator 580 and the region between the conductor 542*a* and the conductor 542*b*. The positions of the conductor 560, the conductor 542*a*, and the conductor 542*b* with respect to the opening of the insulator 580 are selected in a self-aligned manner. That is, in the transistor 500, the gate electrode can be positioned between the source electrode and the drain electrode in a self-aligned manner. Therefore, the conductor 560 can be formed without an alignment margin, resulting in a reduction in the area occupied by the transistor 500. Accordingly, miniaturization and high integration of the semiconductor device can be achieved.

In addition, since the conductor 560 is formed in the region between the conductor 542*a* and the conductor 542*b* in a self-aligned manner, the conductor 560 does not have a region overlapping with the conductor 542*a* or the conductor 542*b*. Thus, parasitic capacitance formed between the conductor 560 and each of the conductor 542*a* and the conductor 542*b* can be reduced. As a result, the switching speed of the transistor 500 can be improved, and the transistor 500 can have high frequency characteristics.

The conductor 560 sometimes functions as a first gate (also referred to as a top gate) electrode. In addition, the conductor 503 sometimes functions as a second gate (also referred to as a bottom gate) electrode. In that case, the threshold voltage of the transistor 500 can be controlled by changing a potential applied to the conductor 503 not in synchronization with but independently of a voltage applied to the conductor 560. In particular, when a negative potential is applied to the conductor 503, the threshold voltage of the transistor 500 can be further increased, and the off-state current can be reduced. Thus, a drain current at the time when a potential applied to the conductor 560 is 0 V can be lower in the case where a negative potential is applied to the conductor 503 than in the case where a negative potential is not applied to the conductor 503.

The conductor 503 is positioned to overlap with the oxide 530 and the conductor 560. Thus, in the case where potentials are applied to the conductor 560 and the conductor 503, an electric field generated from the conductor 560 and an electric field generated from the conductor 503 are connected, so that a channel formation region formed in the oxide 530 can be covered.

In this specification and the like, a transistor structure in which a channel formation region is electrically surrounded by electric fields of a pair of gate electrodes (a first gate electrode and a second gate electrode) is referred to as a surrounded channel (S-channel) structure. The S-channel structure disclosed in this specification and the like is different from a Fin-type structure and a planar structure. With the S-channel structure, resistance to a short-channel effect can be enhanced, that is, a transistor in which a short-channel effect is less likely to occur can be provided.

In addition, the conductor 503 has a structure similar to that of the conductor 518; a conductor 503a is formed in contact with an inner wall of an opening in the insulator 514 and the insulator 516, and a conductor 503b is formed on the inner side. Note that although the transistor 500 having a structure in which the conductor 503a and the conductor 503b are stacked is shown, the present invention is not limited thereto. For example, the conductor 503 may be provided as a single layer or to have a stacked-layer structure of three or more layers.

For the conductor 503a, a conductive material having a function of preventing diffusion of impurities such as a hydrogen atom, a hydrogen molecule, a water molecule, and a copper atom (through which the impurities are less likely to pass) is preferably used. Alternatively, it is preferable to use a conductive material that has a function of inhibiting diffusion of oxygen (e.g., at least one of an oxygen atom, an oxygen molecule, and the like) (through which oxygen is less likely to pass). Note that in this specification, the function of inhibiting diffusion of impurities or oxygen means a function of inhibiting diffusion of any one or all of the impurities and oxygen.

For example, when the conductor 503a has a function of inhibiting diffusion of oxygen, a reduction in conductivity of the conductor 503b due to oxidation can be inhibited.

In addition, in the case where the conductor 503 also functions as a wiring, a conductive material with high conductivity that contains tungsten, copper, or aluminum as its main component is preferably used for the conductor 503b. Note that although the conductor 503 is illustrated to have a stacked layer of the conductor 503a and the conductor 503b in this embodiment, the conductor 503 may have a single-layer structure.

The insulator 522 and the insulator 524 have a function of a second gate insulating film.

Here, as the insulator 524 that is in contact with the oxide 530, an insulator that contains oxygen more than oxygen in the stoichiometric composition is preferably used. Such oxygen is easily released from the insulator by heating. In this specification and the like, oxygen released by heating is sometimes referred to as excess oxygen. That is, a region containing excess oxygen (also referred to as an "excess-oxygen region") is preferably formed in the insulator 524. When such an insulator containing excess oxygen is provided in contact with the oxide 530, oxygen vacancies ($V_O$) in the oxide 530 can be reduced and the reliability of the transistor 500 can be improved. When hydrogen enters the oxygen vacancies in the oxide 530, such defects (hereinafter, referred to as $V_O H$ in some cases) serve as donors and generate electrons serving as carriers in some cases. In other cases, bonding of part of hydrogen to oxygen bonded to a metal atom generates electrons serving as carriers. Thus, a transistor including an oxide semiconductor that contains a large amount of hydrogen is likely to have normally-on characteristics. Moreover, hydrogen in an oxide semiconductor is easily transferred by a stress such as heat or an electric field; thus, a large amount of hydrogen contained in an oxide semiconductor might reduce the reliability of the transistor. In one embodiment of the present invention, $V_O H$ in the oxide 530 is preferably reduced as much as possible so that the oxide 530 becomes a highly purified intrinsic or substantially highly purified intrinsic oxide. It is important to remove impurities such as moisture and hydrogen in an oxide semiconductor (sometimes described as "dehydration" or "dehydrogenation treatment") and to compensate for oxygen vacancies by supplying oxygen to the oxide semiconductor (sometimes described as "oxygen adding treatment") in order to obtain an oxide semiconductor whose $V_O H$ is sufficiently reduced. When an oxide semiconductor with sufficiently reduced impurities such as $V_O H$ is used for a channel formation region of a transistor, stable electrical characteristics can be given.

As the insulator including an excess-oxygen region, specifically, an oxide material that releases part of oxygen by heating is preferably used. An oxide that releases oxygen by heating is an oxide film in which the amount of released oxygen converted into oxygen atoms is greater than or equal to $1.0 \times 10^{18}$ atoms/cm$^3$, preferably greater than or equal to $1.0 \times 10^{19}$ atoms/cm$^3$, further preferably greater than or equal to $2.0 \times 10^{19}$ atoms/cm$^3$ or greater than or equal to $3.0 \times 10^{20}$ atoms/cm$^3$ in TDS (Thermal Desorption Spectroscopy) analysis. Note that the temperature of the film surface in the TDS analysis is preferably within the range of 100° C. to 700° C., or 100° C. to 400° C.

One or more of heat treatment, microwave treatment, and RF treatment may be performed in a state in which the insulator including the excess-oxygen region and the oxide 530 are in contact with each other. By the treatment, water or hydrogen in the oxide 530 can be removed. For example, in the oxide 530, dehydrogenation can be performed when a reaction in which a bond of $V_O H$ is cut occurs, i.e., a reaction of "$V_O H \rightarrow V_O + H$" occurs. Part of hydrogen generated at this time is bonded to oxygen to be $H_2O$, and removed from the oxide 530 or an insulator in the vicinity of the oxide 530 in some cases. Some hydrogen may be gettered into the conductor 542a or the conductor 542b in some cases.

For the microwave treatment, for example, an apparatus including a power source that generates high-density plasma or an apparatus including a power source that applies RF to the substrate side is suitably used. For example, the use of an oxygen-containing gas and high-density plasma enables high-density oxygen radicals to be generated, and application of the RF to the substrate side allows the oxygen radicals generated by the high-density plasma to be efficiently introduced into the oxide 530 or an insulator in the vicinity of the oxide 530. The pressure in the microwave treatment is higher than or equal to 133 Pa, preferably higher than or equal to 200 Pa, further preferably higher than or equal to 400 Pa. As a gas introduced into an apparatus for performing the microwave treatment, for example, oxygen and argon are used and the oxygen flow ratio ($O_2/(O_2+Ar)$) is lower than or equal to 50%, preferably higher than or equal to 10% and lower than or equal to 30%.

In a manufacturing process of the transistor 500, heat treatment is preferably performed with the surface of the oxide 530 exposed. The heat treatment is performed at higher than or equal to 100° C. and lower than or equal to 450° C., preferably higher than or equal to 350° C. and lower than or equal to 400° C., for example. Note that the heat treatment is performed in a nitrogen gas or inert gas atmosphere, or an atmosphere containing an oxidizing gas at 10 ppm or more, 1% or more, or 10% or more. For example, the heat treatment is preferably performed in an oxygen atmosphere. Accordingly, oxygen can be supplied to the oxide 530 to reduce oxygen vacancies ($V_O$). The heat treatment may be performed under reduced pressure. Alternatively, the heat treatment may be performed in such a manner that heat treatment is performed in a nitrogen gas or inert gas atmosphere and then another heat treatment is performed in an atmosphere containing an oxidizing gas at 10 ppm or more, 1% or more, or 10% or more in order to compensate for released oxygen. Alternatively, the heat treatment may be performed in such a manner that heat treatment is performed in an atmosphere containing an oxidizing gas at 10 ppm or more, 1% or more, or 10% or more, and then another heat treatment is successively performed in a nitrogen gas or inert gas atmosphere.

Note that the oxygen adding treatment performed on the oxide 530 can promote a reaction in which oxygen vacancies in the oxide 530 are filled with supplied oxygen, i.e., a reaction of "$V_O+O \rightarrow null$". Furthermore, hydrogen remaining in the oxide 530 reacts with supplied oxygen, so that the hydrogen can be removed as $H_2O$ (dehydration). This can inhibit recombination of hydrogen remaining in the oxide 530 with oxygen vacancies and formation of $V_OH$.

In addition, in the case where the insulator 524 includes an excess-oxygen region, it is preferable that the insulator 522 have a function of inhibiting diffusion of oxygen (e.g., an oxygen atom, an oxygen molecule, or the like) (through which oxygen is less likely to pass).

When the insulator 522 has a function of inhibiting diffusion of oxygen or impurities, oxygen contained in the oxide 530 is not diffused to the conductor 503 side, which is preferable. Furthermore, the conductor 503 can be inhibited from reacting with oxygen contained in the insulator 524 or the oxide 530.

For the insulator 522, a single layer or stacked layers of an insulator containing what is called a high-k material such as aluminum oxide, hafnium oxide, an oxide containing aluminum and hafnium (hafnium aluminate), tantalum oxide, zirconium oxide, lead zirconate titanate (PZT), strontium titanate ($SrTiO_3$), or ($Ba,Sr$)$TiO_3$ (BST) are preferably used, for example. As miniaturization and high integration of transistors progress, a problem such as a leakage current might arise because of a thinner gate insulating film. When a high-k material is used for an insulator functioning as the gate insulating film, a gate potential during transistor operation can be reduced while the physical thickness is maintained.

It is particularly preferable to use an insulator containing an oxide of one or both of aluminum and hafnium, which is an insulating material having a function of inhibiting diffusion of impurities, oxygen, and the like (through which oxygen is less likely to pass). Aluminum oxide, hafnium oxide, an oxide containing aluminum and hafnium (hafnium aluminate), or the like is preferably used as the insulator containing an oxide of one or both of aluminum and hafnium. In the case where the insulator 522 is formed using such a material, the insulator 522 functions as a layer that inhibits release of oxygen from the oxide 530 and mixing of impurities such as hydrogen from the periphery of the transistor 500 into the oxide 530.

Alternatively, aluminum oxide, bismuth oxide, germanium oxide, niobium oxide, silicon oxide, titanium oxide, tungsten oxide, yttrium oxide, or zirconium oxide may be added to these insulators, for example. Alternatively, these insulators may be subjected to nitriding treatment. The insulator over which silicon oxide, silicon oxynitride, or silicon nitride is stacked may be used.

Note that in the transistor 500 in FIG. 13A and FIG. 13B, the insulator 522 and the insulator 524 are shown as the second gate insulating film having a stacked-layer structure of three layers; however, the second gate insulating film may be a single layer or may have a stacked-layer structure of two layers or four or more layers. In such cases, without limitation to a stacked-layer structure formed of the same material, a stacked-layer structure formed of different materials may be employed.

In the transistor 500, a metal oxide functioning as an oxide semiconductor is preferably used as the oxide 530 including a channel formation region. For example, as the oxide 530, a metal oxide such as an In—M—Zn oxide (the element M is one or more kinds selected from aluminum, gallium, yttrium, copper, vanadium, beryllium, boron, titanium, iron, nickel, germanium, zirconium, molybdenum, lanthanum, cerium, neodymium, hafnium, tantalum, tungsten, magnesium, and the like) is preferably used.

The metal oxide functioning as an oxide semiconductor may be formed by a sputtering method or an ALD (Atomic Layer Deposition) method. Note that the metal oxide functioning as an oxide semiconductor is described in detail in another embodiment.

The metal oxide functioning as the channel formation region in the oxide 530 has a band gap of preferably 2 eV or higher, further preferably 2.5 eV or higher. With use of a metal oxide having such a wide band gap, the off-state current of the transistor can be reduced.

When the oxide 530 includes the oxide 530a under the oxide 530b, it is possible to inhibit diffusion of impurities into the oxide 530b from the components formed below the oxide 530a.

Note that the oxide 530 preferably has a stacked-layer structure of a plurality of oxide layers that differ in the atomic ratio of metal atoms. Specifically, the atomic ratio of the element M to the constituent elements in the metal oxide used as the oxide 530a is preferably higher than the atomic ratio of the element M to the constituent elements in the metal oxide used as the oxide 530b. In addition, the atomic ratio of the element M to In in the metal oxide used as the oxide 530a is preferably higher than the atomic ratio of the element M to In in the metal oxide used as the oxide 530b. Furthermore, the atomic ratio of In to the element M in the metal oxide used as the oxide 530b is preferably higher than the atomic ratio of In to the element M in the metal oxide used as the oxide 530a.

The energy of the conduction band minimum of the oxide 530a is preferably higher than the energy of the conduction band minimum of the oxide 530b. In other words, the electron affinity of the oxide 530a is preferably smaller than the electron affinity of the oxide 530b.

Here, the energy level of the conduction band minimum gently changes at a junction portion of the oxide 530a and the oxide 530b. In other words, the energy level of the conduction band minimum at the junction portion of the oxide 530a and the oxide 530b continuously changes or is continuously connected. This can be obtained by decreasing the density of defect states in a mixed layer formed at the interface between the oxide 530a and the oxide 530b.

Specifically, when the oxide 530a and the oxide 530b contain a common element (as a main component) in addition to oxygen, a mixed layer with a low density of defect states can be formed. For example, in the case where the oxide 530b is an In—Ga—Zn oxide, an In—Ga—Zn oxide, a Ga—Zn oxide, gallium oxide, or the like is used as the oxide 530a.

At this time, the oxide 530b serves as a main carrier path. When the oxide 530a has the above-described structure, the density of defect states at the interface between the oxide 530a and the oxide 530b can be made low. Thus, the influence of interface scattering on carrier conduction is small, and the transistor 500 can have a high on-state current.

The conductor 542a and the conductor 542b functioning as the source electrode and the drain electrode are provided over the oxide 530b. For the conductor 542a and conductor 542b, it is preferable to use a metal element selected from aluminum, chromium, copper, silver, gold, platinum, tantalum, nickel, titanium, molybdenum, tungsten, hafnium, vanadium, niobium, manganese, magnesium, zirconium, beryllium, indium, ruthenium, iridium, strontium, and lanthanum; an alloy containing any of the above metal elements; an alloy containing a combination of the above metal elements; or the like. For example, it is preferable to use tantalum nitride, titanium nitride, tungsten, a nitride containing titanium and aluminum, a nitride containing tantalum and aluminum, ruthenium oxide, ruthenium nitride, an oxide containing strontium and ruthenium, an oxide containing lanthanum and nickel, or the like. In addition, tantalum nitride, titanium nitride, a nitride containing titanium and aluminum, a nitride containing tantalum and aluminum, ruthenium oxide, ruthenium nitride, an oxide containing strontium and ruthenium, and an oxide containing lanthanum and nickel are preferable because they are conductive materials that are not easily oxidized or materials that retain their conductivity even after absorbing oxygen. Furthermore, a metal nitride film of tantalum nitride or the like is preferable because it has a barrier property against hydrogen or oxygen.

In addition, although the conductor 542a and the conductor 542b each having a single-layer structure are shown in FIG. 13A, a stacked-layer structure of two or more layers may be employed. For example, it is preferable to stack a tantalum nitride film and a tungsten film. Alternatively, a titanium film and an aluminum film may be stacked. Alternatively, a two-layer structure where an aluminum film is stacked over a tungsten film, a two-layer structure where a copper film is stacked over a copper-magnesium-aluminum alloy film, a two-layer structure where a copper film is stacked over a titanium film, or a two-layer structure where a copper film is stacked over a tungsten film may be employed.

Other examples include a three-layer structure where a titanium film or a titanium nitride film is formed, an aluminum film or a copper film is stacked over the titanium film or the titanium nitride film, and a titanium film or a titanium nitride film is formed thereover; and a three-layer structure where a molybdenum film or a molybdenum nitride film is formed, an aluminum film or a copper film is stacked over the molybdenum film or the molybdenum nitride film, and a molybdenum film or a molybdenum nitride film is formed thereover. Note that a transparent conductive material containing indium oxide, tin oxide, or zinc oxide may be used.

In addition, as shown in FIG. 13A, a region 543a and a region 543b are sometimes formed as low-resistance regions at an interface between the oxide 530 and the conductor 542a (the conductor 542b) and in the vicinity of the interface. In that case, the region 543a functions as one of a source region and a drain region, and the region 543b functions as the other of the source region and the drain region. Furthermore, the channel formation region is formed in a region between the region 543a and the region 543b.

When the conductor 542a (the conductor 542b) is provided to be in contact with the oxide 530, the oxygen concentration in the region 543a (the region 543b) sometimes decreases. In addition, a metal compound layer that contains the metal contained in the conductor 542a (the conductor 542b) and the component of the oxide 530 is sometimes formed in the region 543a (the region 543b). In such a case, the carrier density of the region 543a (the region 543b) increases, and the region 543a (the region 543b) becomes a low-resistance region.

The insulator 544 is provided to cover the conductor 542a and the conductor 542b and inhibits oxidation of the conductor 542a and the conductor 542b. At this time, the insulator 544 may be provided to cover a side surface of the oxide 530 and to be in contact with the insulator 524.

A metal oxide containing one kind or two or more kinds selected from hafnium, aluminum, gallium, yttrium, zirconium, tungsten, titanium, tantalum, nickel, germanium, neodymium, lanthanum, magnesium, and the like can be used for the insulator 544. Alternatively, silicon nitride oxide, silicon nitride, or the like can be used for the insulator 544.

It is particularly preferable to use an insulator containing an oxide of one or both of aluminum and hafnium, such as aluminum oxide, hafnium oxide, or an oxide containing aluminum and hafnium (hafnium aluminate), as the insulator 544. In particular, hafnium aluminate has higher heat resistance than a hafnium oxide film. Therefore, hafnium aluminate is preferable because it is less likely to be crystallized by heat treatment in a later step. Note that the insulator 544 is not an essential component when the conductor 542a and the conductor 542b are oxidation-resistant materials or do not significantly lose their conductivity even after absorbing oxygen. Design is appropriately determined in consideration of required transistor characteristics.

When the insulator 544 is included, diffusion of impurities such as water and hydrogen contained in the insulator 580 into the oxide 530b can be inhibited. Furthermore, oxidation of the conductor 542a and the conductor 542b due to excess oxygen contained in the insulator 580 can be inhibited.

The insulator 545 functions as a first gate insulating film. Like the insulator 524, the insulator 545 is preferably formed using an insulator that contains excess oxygen and releases oxygen by heating.

Specifically, silicon oxide containing excess oxygen, silicon oxynitride, silicon nitride oxide, silicon nitride, silicon oxide to which fluorine is added, silicon oxide to which carbon is added, silicon oxide to which carbon and nitrogen are added, or porous silicon oxide can be used. In particular, silicon oxide and silicon oxynitride are preferable because they are thermally stable.

When an insulator containing excess oxygen is provided as the insulator 545, oxygen can be effectively supplied from the insulator 545 to the channel formation region of the oxide 530b. Furthermore, as in the insulator 524, the concentration of impurities such as water or hydrogen in the insulator 545 is preferably reduced. The thickness of the insulator 545 is preferably greater than or equal to 1 nm and less than or equal to 20 nm. After and/or formation of the insulator 545, the above-described microwave treatment may be performed.

Furthermore, to efficiently supply excess oxygen contained in the insulator 545 to the oxide 530, a metal oxide may be provided between the insulator 545 and the conductor 560. The metal oxide preferably inhibits diffusion of oxygen from the insulator 545 into the conductor 560. Providing the metal oxide that inhibits diffusion of oxygen inhibits diffusion of excess oxygen from the insulator 545 into the conductor 560. That is, reduction in the amount of excess oxygen supplied to the oxide 530 can be inhibited. Moreover, oxidation of the conductor 560 due to excess oxygen can be inhibited. For the metal oxide, a material that can be used for the insulator 544 is used.

Note that the insulator 545 may have a stacked-layer structure like the second gate insulating film. As miniaturization and high integration of transistors progress, a problem such as a leakage current might arise because of a thinner gate insulating film. For that reason, when the insulator functioning as the gate insulating film has a stacked-layer structure of a high-k material and a thermally stable material, a gate potential during transistor operation can be reduced while the physical thickness is maintained. Furthermore, the stacked-layer structure can be thermally stable and have a high dielectric constant.

Although the conductor 560 that functions as the first gate electrode and has a two-layer structure is shown in FIG. 13A and FIG. 13B, a single-layer structure or a stacked-layer structure of three or more layers may be employed.

For the conductor 560a, it is preferable to use a conductive material having a function of inhibiting diffusion of impurities such as a hydrogen atom, a hydrogen molecule, a water molecule, a nitrogen atom, a nitrogen molecule, a nitrogen oxide molecule ($N_2O$, NO, $NO_2$, and the like), and a copper atom. Alternatively, it is preferable to use a conductive material that has a function of inhibiting the diffusion of oxygen (e.g., at least one of an oxygen atom, an oxygen molecule, and the like). When the conductor 560a has a function of inhibiting diffusion of oxygen, a reduction in conductivity of the conductor 560b due to oxidation caused by oxygen contained in the insulator 545 can be inhibited. As a conductive material having a function of inhibiting diffusion of oxygen, for example, tantalum, tantalum nitride, ruthenium, ruthenium oxide, or the like is preferably used. For the conductor 560a, the oxide semiconductor that can be used as the oxide 530 can be used. In that case, when the conductor 560b is deposited using a sputtering method, the conductor 560a can have a reduced value of electrical resistance to be a conductor. Such a conductor can be referred to as an OC (Oxide Conductor) electrode.

In addition, a conductive material containing tungsten, copper, or aluminum as its main component is preferably used for the conductor 560b. Furthermore, the conductor 560b also functions as a wiring and thus a conductor having high conductivity is preferably used as the conductor 560b. For example, a conductive material containing tungsten, copper, or aluminum as its main component can be used. The conductor 560b may have a stacked-layer structure, for example, a stacked-layer structure of any of the above conductive materials and titanium or titanium nitride.

The insulator 580 is provided over the conductor 542a and the conductor 542b with the insulator 544 therebetween. The insulator 580 preferably includes an excess-oxygen region. For example, silicon oxide, silicon oxynitride, silicon nitride oxide, silicon nitride, silicon oxide to which fluorine is added, silicon oxide to which carbon is added, silicon oxide to which carbon and nitrogen are added, porous silicon oxide, resin, or the like is preferably contained as the insulator 580. In particular, silicon oxide and silicon oxynitride are preferable because they are thermally stable. In particular, silicon oxide and porous silicon oxide are preferable because an excess-oxygen region can be easily formed in a later step.

The insulator 580 preferably includes an excess-oxygen region. When the insulator 580 that releases oxygen by heating is provided, oxygen in the insulator 580 can be efficiently supplied to the oxide 530. Note that the concentration of impurities such as water or hydrogen in the insulator 580 is preferably reduced.

The opening of the insulator 580 is formed to overlap with the region between the conductor 542a and the conductor 542b. Accordingly, the conductor 560 is formed to be embedded in the opening of the insulator 580 and the region between the conductor 542a and the conductor 542b.

The gate length needs to be short for miniaturization of the semiconductor device, but it is necessary to prevent a reduction in conductivity of the conductor 560. When the conductor 560 is made thick to achieve this, the conductor 560 might have a shape with a high aspect ratio. In this embodiment, the conductor 560 is provided to be embedded in the opening of the insulator 580; thus, even when the conductor 560 has a shape with a high aspect ratio, the conductor 560 can be formed without collapsing during the process.

The insulator 574 is preferably provided in contact with a top surface of the insulator 580, a top surface of the conductor 560, and a top surface of the insulator 545. When the insulator 574 is deposited using a sputtering method, excess-oxygen regions can be provided in the insulator 545 and the insulator 580. Accordingly, oxygen can be supplied from the excess-oxygen regions to the oxide 530.

For example, a metal oxide containing one kind or two or more kinds selected from hafnium, aluminum, gallium, yttrium, zirconium, tungsten, titanium, tantalum, nickel, germanium, magnesium, and the like can be used as the insulator 574.

In particular, aluminum oxide has a high barrier property, and even a thin aluminum oxide film having a thickness greater than or equal to 0.5 nm and less than or equal to 3.0 nm can inhibit diffusion of hydrogen and nitrogen. Accordingly, aluminum oxide deposited by a sputtering method serves as an oxygen supply source and can also have a function of a barrier film against impurities such as hydrogen.

In addition, an insulator 581 functioning as an interlayer film is preferably provided over the insulator 574. As in the insulator 524 or the like, the concentration of impurities such as water or hydrogen in the insulator 581 is preferably reduced.

Furthermore, a conductor 540a and a conductor 540b are positioned in openings formed in the insulator 581, the insulator 574, the insulator 580, and the insulator 544. The conductor 540a and the conductor 540b are provided to face each other with the conductor 560 therebetween. The structure of the conductor 540a and the conductor 540b are similar to a structure of a conductor 546 and a conductor 548 that will be described later.

An insulator 582 is provided over the insulator 581. A substance having a barrier property against oxygen or hydrogen is preferably used for the insulator 582. Therefore, a material similar to that for the insulator 514 can be used for the insulator 582. For the insulator 582, a metal oxide such as aluminum oxide, hafnium oxide, or tantalum oxide is preferably used, for example.

In particular, aluminum oxide has an excellent blocking effect that prevents the passage of both oxygen and impurities such as hydrogen and moisture which are factors of change in electrical characteristics of the transistor. Accordingly, aluminum oxide can prevent mixing of impurities such as hydrogen and moisture into the transistor 500 in the manufacturing process and after the manufacturing of the transistor. In addition, release of oxygen from the oxide included in the transistor 500 can be inhibited. Therefore, aluminum oxide is suitably used for a protective film of the transistor 500.

In addition, an insulator 586 is provided over the insulator 582. For the insulator 586, a material similar to that for the insulator 420 can be used. Furthermore, when a material with a relatively low permittivity is used for these insulators, parasitic capacitance generated between wirings can be reduced. A silicon oxide film, a silicon oxynitride film, or the like can be used for the insulator 586, for example.

Furthermore, the conductor 546, the conductor 548, and the like are embedded in the insulator 522, the insulator 524, the insulator 544, the insulator 580, the insulator 574, the insulator 581, the insulator 582, and the insulator 586.

The conductor 546 and the conductor 548 have functions of plugs or wirings that are connected to the capacitor 600, the transistor 500, or the transistor 550. The conductor 546 and the conductor 548 can be provided using a material similar to those for the conductor 428 and the conductor 430.

After the transistor 500 is formed, an opening may be formed to surround the transistor 500 and an insulator having a high barrier property against hydrogen or water may be formed to cover the opening. Surrounding the transistor 500 with the insulator having a high barrier property can prevent entry of moisture and hydrogen from the outside. Alternatively, a plurality of transistors 500 may be collectively surrounded by the insulator having a high barrier property against hydrogen or water. When an opening is formed to surround the transistor 500, for example, the formation of an opening reaching the insulator 522 or the insulator 514 and the formation of the insulator having a high barrier property in contact with the insulator 522 or the insulator 514 are suitable because these formation steps can also serve as part of the manufacturing steps of the transistor 500. The insulator having a high barrier property against hydrogen or water is formed using a material similar to that for the insulator 522 or the insulator 514, for example.

Next, the capacitor 600 is provided above the transistor 500. The capacitor 600 includes a conductor 610, a conductor 620, and an insulator 630.

In addition, a conductor 612 may be provided over the conductor 546 and the conductor 548. The conductor 612 has a function of a plug or a wiring that is connected to the transistor 500. The conductor 610 has a function of an electrode of the capacitor 600. Note that the conductor 612 and the conductor 610 can be formed at the same time.

For the conductor 612 and the conductor 610, a metal film containing an element selected from molybdenum, titanium, tantalum, tungsten, aluminum, copper, chromium, neodymium, and scandium; a metal nitride film containing the above element as its component (a tantalum nitride film, a titanium nitride film, a molybdenum nitride film, or a tungsten nitride film); or the like can be used. Alternatively, it is possible to use a conductive material such as indium tin oxide, indium oxide containing tungsten oxide, indium zinc oxide containing tungsten oxide, indium oxide containing titanium oxide, indium tin oxide containing titanium oxide, indium zinc oxide, or indium tin oxide to which silicon oxide is added.

Although the conductor 612 and the conductor 610 each having a single-layer structure are shown in this embodiment, the structure is not limited thereto; a stacked-layer structure of two or more layers may be employed. For example, between a conductor having a barrier property and a conductor having high conductivity, a conductor that is highly adhesive to the conductor having a barrier property and the conductor having high conductivity may be formed.

The conductor 620 is provided to overlap with the conductor 610 with the insulator 630 therebetween. Note that a conductive material such as a metal material, an alloy material, or a metal oxide material can be used for the conductor 620. It is preferable to use a high-melting-point material that has both heat resistance and conductivity, such as tungsten or molybdenum, and it is particularly preferable to use tungsten. In addition, in the case where the conductor 620 is formed concurrently with another component such as a conductor, Cu (copper), Al (aluminum), or the like, which is a low-resistance metal material, is used.

An insulator 640 is provided over the conductor 620 and the insulator 630. For the insulator 640, a material similar to that for the insulator 420 can be used. In addition, the insulator 640 may function as a planarization film that covers an uneven shape therebelow.

With use of this structure, a semiconductor device using a transistor including an oxide semiconductor can be miniaturized or highly integrated.

The composition, structure, method, and the like described in this embodiment can be used in combination as appropriate with the compositions, structures, methods, and the like described in the other embodiments and the like.

REFERENCE NUMERALS

10: living body, 100: semiconductor device, 110: communication portion, 111: RF circuit, 112: resonant circuit, 113: power supply circuit, 114: clock generation circuit, 115: demodulation circuit, 116: modulation circuit, 117: information processing circuit, 120: arithmetic portion, 121: arithmetic circuit, 122: memory circuit, 130: control portion, 140: memory portion, 150: sensor portion, 190: coating material This application is based on Japanese Patent Application Serial No. 2020-086266 filed on May 15, 2020, the entire contents are hereby incorporated herein by reference.

The invention claimed is:

1. A semiconductor device being embeddable in a living body, comprising a communication portion, a control portion, a memory portion, an arithmetic portion, and a sensor portion, wherein the memory portion is configured to retain identification information, wherein the arithmetic portion is configured to retain first information, and to use the first information and second information supplied from the sensor portion to generate third information, wherein the control portion is configured to output, through the communication portion to the outside, one or both of the identification information and the third information, in response to a signal input through the communication portion, wherein the arithmetic portion comprises an arithmetic circuit and a memory circuit provided over the arithmetic circuit, the memory circuit comprising a transistor comprising an oxide semiconductor in a channel formation region, wherein each of the communication portion, the control portion, the memory portion, the arithmetic portion, and the sensor portion are provided on a same surface, and wherein each of the communication portion, the control portion, the memory portion, the arithmetic portion, and the sensor portion do not overlap each other.

2. The semiconductor device according to claim 1, wherein the arithmetic portion is configured to perform a product-sum operation, and wherein the first information is weight information.

3. The semiconductor device according to claim 1, wherein the oxide semiconductor comprises one or both of indium and zinc.

4. The semiconductor device according to claim 1, covered with a coating material.

5. The semiconductor device according to claim 4, wherein the coating material comprises a silicon resin.

6. The semiconductor device according to claim 1, wherein the first information is weight information used for a product-sum operation of a neural network, and wherein the first information is read out via the transistor.

7. A semiconductor device being embeddable in a living body, comprising a communication portion, a control portion, a memory portion, an arithmetic portion, and a sensor portion, wherein the memory portion is configured to retain identification information, wherein the arithmetic portion is configured to retain first information, and to use the first information and second information supplied from the sensor portion to generate third information, wherein the control portion is configured to output, through the communication portion to the outside, one or both of the identification information and the third information, in response to a signal input through the communication portion, wherein the arithmetic portion comprises an arithmetic circuit and a memory circuit provided over the arithmetic circuit, the memory circuit comprising a transistor comprising an oxide semiconductor in a channel formation region, wherein the semiconductor device is covered with a coating material, wherein each of the communication portion, the control portion, the memory portion, the arithmetic portion, and the sensor portion are provided over the coating material, and wherein each of the communication portion, the control portion, the memory portion, the arithmetic portion, and the sensor portion do not overlap each other.

8. The semiconductor device according to claim 7, wherein the first information is weight information used for a product-sum operation of a neural network, and wherein the first information is read out via the transistor.

9. A semiconductor device being embeddable in a living body, comprising a communication portion, a control portion, a memory portion, an arithmetic portion, and a sensor portion, wherein the memory portion is configured to retain identification information, wherein the arithmetic portion is configured to retain first information, and to use the first information and second information supplied from the sensor portion to generate third information, wherein the control portion is configured to output, through the communication portion to the outside, one or both of the identification information and the third information, in response to a signal input through the communication portion, wherein the arithmetic portion comprises an arithmetic circuit and a memory circuit provided over the arithmetic circuit, the arithmetic portion comprising a first transistor comprising silicon in a channel formation region and the memory circuit comprising a second transistor comprising an oxide semiconductor in a channel formation region, wherein the semiconductor device is covered with a coating material, wherein each of the communication portion, the control portion, the memory portion, the arithmetic portion, and the sensor portion are provided on a same surface, wherein each of the communication portion, the control portion, the memory portion, the arithmetic portion, and the sensor portion do not overlap each other, wherein the semiconductor device is configured to obtain biological information of the living body, and wherein the biological information is used as the identification information.

10. The semiconductor device according to claim 9, wherein the communication portion comprises:

an RF circuit; and an information processing circuit, wherein the RF circuit comprises:

a resonant circuit;

a power supply circuit;

a clock generation circuit;

a demodulation circuit; and a modulation circuit.

11. The semiconductor device according to claim 9, wherein the first information is weight information used for a product-sum operation of a neural network, and wherein the first information is read out via the second transistor.

* * * * *